United States Patent
Huang et al.

(10) Patent No.: US 10,461,835 B2
(45) Date of Patent: Oct. 29, 2019

(54) COMMUNICATION METHOD, BASE STATION, AND USER EQUIPMENT

(71) Applicant: HUAWEI TECHNOLOGIES CO., LTD., Shenzhen (CN)

(72) Inventors: Huang Huang, Chengdu (CN); Xianfeng Du, Chengdu (CN); Minghui Xu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/826,656

(22) Filed: Nov. 29, 2017

(65) Prior Publication Data
US 2018/0109307 A1    Apr. 19, 2018

Related U.S. Application Data

(63) Continuation of application No. PCT/CN2015/080443, filed on May 30, 2015.

(51) Int. Cl.
*H04B 7/08* (2006.01)
*H04B 17/309* (2015.01)
(Continued)

(52) U.S. Cl.
CPC ........... *H04B 7/088* (2013.01); *H04B 7/0695* (2013.01); *H04B 17/309* (2015.01);
(Continued)

(58) Field of Classification Search
CPC .... H04B 7/088; H04B 17/309; H04B 7/0695; H04W 56/001; H04W 72/02; H04W 72/046; H04W 72/12
See application file for complete search history.

(56) References Cited

U.S. PATENT DOCUMENTS

| 2009/0005121 | A1 | 1/2009 | Wong et al. |
| 2009/0191866 | A1 | 7/2009 | Flore et al. |

(Continued)

FOREIGN PATENT DOCUMENTS

| CN | 101689712 A | 3/2010 |
| CN | 102571181 A | 7/2012 |

(Continued)

*Primary Examiner* — Ronald B Abelson
(74) *Attorney, Agent, or Firm* — Kilpatrick Townsend & Stockton LLP

(57) ABSTRACT

Embodiments of the present application disclose a communication method, including: performing, by a base station, beam scanning and alignment together with first terminal in a first subframe, to determine a beam that is used for sending data in the first subframe; and sending, by the base station, beam information of the beam used for sending data, where the beam information includes at least identification information of the beam and a synchronization signal, the synchronization signal is used by second terminal to synchronize with the base station, and the identification information of the beam is used by the first terminal and the second terminal to identify the beam sent by the base station. According to the present application, a time for scanning and alignment can be reduced, so as to facilitate quick access of a user that is to perform access.

20 Claims, 16 Drawing Sheets

(51) Int. Cl.
*H04B 7/06* (2006.01)
*H04W 56/00* (2009.01)
*H04W 72/02* (2009.01)
*H04W 72/04* (2009.01)
*H04W 72/12* (2009.01)
*H04W 72/08* (2009.01)

(52) U.S. Cl.
CPC ......... *H04W 56/001* (2013.01); *H04W 72/02* (2013.01); *H04W 72/046* (2013.01); *H04W 72/12* (2013.01); *H04W 72/085* (2013.01)

(56) References Cited

U.S. PATENT DOCUMENTS

| | | |
|---|---|---|
| 2013/0028186 A1 | 1/2013 | Kim |
| 2013/0040684 A1 | 2/2013 | Yu et al. |
| 2013/0072244 A1 | 3/2013 | Jeong et al. |
| 2013/0295852 A1 | 11/2013 | Kim et al. |
| 2014/0004897 A1 | 1/2014 | Jung et al. |
| 2014/0120926 A1 | 5/2014 | Shin et al. |
| 2016/0197709 A1* | 7/2016 | Shen ..................... H04L 5/0048 |
| 2017/0201304 A1 | 7/2017 | Kim |

FOREIGN PATENT DOCUMENTS

| | | | |
|---|---|---|---|
| CN | 103875190 A | 6/2014 | |
| GB | 2493703 | 2/2013 | |
| JP | 2012528514 A | 11/2012 | |
| JP | 2014524217 A | 9/2014 | |
| JP | WO 2015033930 | * 3/2015 | ............ H04W 74/04 |
| KR | 20130014391 A | 2/2013 | |
| KR | 20140056561 A | 5/2014 | |
| RU | 2461984 C2 | 9/2012 | |
| WO | 2013109059 A1 | 3/2005 | |
| WO | 2007117186 A1 | 10/2007 | |
| WO | 2013109059 A1 | 7/2013 | |
| WO | 2013188629 A2 | 12/2013 | |

* cited by examiner

COMMUNICATION METHOD, BASE STATION, AND USER EQUIPMENT

CROSS-REFERENCE TO RELATED APPLICATIONS

This Application is a continuation of International Application No. PCT/CN2015/080443, filed on May 30, 2015, the disclosure of which is hereby incorporated by reference in its entirety.

TECHNICAL FIELD

The present application relates to the field of communications technologies, and in particular, to a communication method, a base station, and user equipment.

BACKGROUND

As a quantity of mobile terminals and a data amount required by a user increase, bandwidth of a frequency band below 6G currently cannot meet a requirement for an increasing communication data amount. Therefore, using a high frequency band (30G to 300G or a higher frequency band) having rich bandwidth resources as a backhaul frequency band and an access frequency band will become a trend. However, compared with a frequency band below 6G a large path loss is one of distinct features of the high frequency band. To ensure a particular transmission distance, a high frequency beam needs to be relatively narrow to achieve a relatively large gain. However, because a coverage area of a narrow beam system is limited, to obtain a maximum antenna gain, a base station (BS for short) end and user equipment (UE for short) need to perform narrow beam scanning and alignment before data transmission, so as to implement normal communication between the BS and the UE.

In a scanning and alignment phase in the prior art, a fixed timeslot used for periodic scanning needs to be configured in each subframe. In addition, traversing needs to be performed in all directions during each scanning, so that an optimal combination of a transmit beam and a receive beam can be selected, to implement subsequent data transmission. For example, a transmit end has four different beams (Z1-Z4), and each beam carries corresponding beam information of the beam. Scanning of the four beams is completed in an initial phase of each subframe, and each beam occupies a timeslot, for example, 10 μs. Therefore, the first 40 μs of each subframe is used for beam scanning and alignment, and remaining 960 μs is used for data transmission. A receive end also has four beams (RX1-RX4), and a scanned beam is changed in each subframe, that is, 1 ms. In this case, a total of 4 ms is required to complete scanning of all 16 beam combinations of the receive beams and the transmit beams. The receive end demodulates beam information of the beams at the transmit end, and then feeds back, in a data transmission phase, information about an optimal combination of a transmit beam and a receive beam to the transmit end (for example, the transmit beam is Z3, and the receive beam is R2). The transmit end performs sending in the data transmission phase by using the beam Z3, and the receive end performs receiving by using the beam R2. Because in the whole process, a fixed timeslot used for scanning needs to be configured in each subframe, and traversing needs to be performed in all directions during each scanning, a lot of time is spent, and a large quantity of resources are occupied.

SUMMARY

Embodiments of the present application provide a communication method, a base station, and user equipment, to resolve a problem that narrow beam communication requires a long scanning time and occupies a large quantity of resources.

According to a first aspect, an embodiment of the present application provides a communication method, including:

performing, by a base station, beam scanning and alignment together with first user equipment in a first subframe, to determine a beam that is used for sending data in the first subframe, where a quantity of beams used for sending data is greater than or equal to 1; and when sending data to the first user equipment by using the beam, sending, by the base station, beam information of the beam used for sending data, where the beam information includes at least identification information of the beam and a synchronization signal, where the synchronization signal is used by second user equipment to synchronize with the base station; and the identification information of the beam is used by the first user equipment and the second user equipment to identify the beam sent by the base station.

According to a second aspect, an embodiment of the present application provides a communication method, including:

when a base station performs beam scanning and alignment together with user equipment in a first subframe, determining a beam that is used for sending data in the first subframe;

when the base station sends data to the user equipment, receiving beam information sent by the base station when the base station sends the data by using the beam, where the beam information includes at least identification information of the beam and a synchronization signal;

synchronizing with the base station according to the synchronization signal; and identifying, according to the identification information of the beam, the beam sent by the base station.

According to a third aspect, an embodiment of the present application provides a base station, including:

a beam scanning unit, configured to perform beam scanning and alignment together with first user equipment in a first subframe, to determine a beam that is used for sending data in the first subframe, where a quantity of beams used for sending data is greater than or equal to 1; and a sending unit, configured to send data to the first user equipment by using the beam, and send beam information of the beam, where the beam information includes at least identification information of the beam and a synchronization signal; where the synchronization signal is used by second user equipment to synchronize with the base station; and the identification information of the beam is used by the first user equipment and the second user equipment to identify the beam sent by the base station.

According to a fourth aspect, an embodiment of the present application provides a base station, including:

a receiver, a transmitter, a memory, and a processor, where the receiver, the transmitter, the memory, and the processor are connected to a bus, the memory stores a group of program code, and the processor is configured to invoke the program code stored in the memory to perform the following operations:

performing beam scanning and alignment together with first user equipment in a first subframe, to determine a beam that is used for sending data in the first subframe, where a quantity of beams used for sending data is greater than or equal to 1; and instructing the transmitter to send, when the transmitter sends data to the first user equipment, beam information of the beam used for sending data, where the beam information includes at least identification information of the beam and a synchronization signal, where the synchronization signal is used by second user equipment to synchronize with the base station; and the identification information of the beam is used by the first user equipment and the second user equipment to identify the beam sent by the base station.

According to a fifth aspect, an embodiment of the present application further provides a computer storage medium, where the computer storage medium stores a program, and when the program runs, the steps according to any implementation manner of the first and the second aspects of the embodiments of the present application are included.

According to a sixth aspect, an embodiment of the present application provides user equipment, including:

a beam scanning unit, configured to: perform beam scanning alignment with a base station in a first subframe, to determine a beam that is used for sending data in the first subframe; and a receiving unit, configured to: receive data sent by the base station by using the beam, and receive beam information sent by the base station when the base station sends the data by using the beam, where the beam information includes at least identification information of the beam and a synchronization signal;

a synchronization unit, configured to synchronize with the base station according to the synchronization signal; and an identifying unit, configured to identify, according to the identification information of the beam, the beam sent by the base station.

According to a seventh aspect, an embodiment of the present application provides user equipment, including:

a receiver, a transmitter, a memory, and a processor, where the receiver, the transmitter, the memory, and the processor are connected to a bus; and the memory stores a group of program code, and the processor is configured to invoke the program code stored in the memory to perform the following operations:

when a base station performs beam scanning and alignment together with the user equipment in a first subframe, determining a beam that is used for sending data in the first subframe;

when the base station sends data to the user equipment, receiving beam information sent by the base station when the base station sends the data by using the beam, where the beam information includes at least identification information of the beam and a synchronization signal;

synchronizing with the base station according to the synchronization signal; and identifying, according to the identification information of the beam, the beam sent by the base station.

According to an eighth aspect, an embodiment of the present application provides a computer storage medium, where the computer storage medium stores a program, and when the program runs, the steps according to any implementation manner of the third and the fourth aspects of the embodiments of the present application are included.

The following beneficial effects are achieved by implementing the embodiments of the present application:

As beam information carried when a base station sends data to first UE is also sent to second UE, when the base station and the first UE perform scanning and alignment in a next subframe, some or all of scheduled beams may not be scanned repeatedly any longer. This helps to reduce a scanning time, and reduce time-frequency resources occupied during scanning. In addition, as the second UE can receive the beam information when the base station and the first UE perform data transmission, the second UE can learn, according to the beam information, an accessible beam, thereby facilitating quick access of the second UE.

BRIEF DESCRIPTION OF DRAWINGS

To describe the technical solutions in the embodiments of the present application or in the prior art more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

The embodiments of the present application may be applied to a high-frequency wireless cellular transmission system, or may be applied to an 802.11ad Wireless Gigabit (WiGig for short) system. That is, a communication method, a base station, and user equipment described in the embodiments of the present application may be applied to a scenario in which a base station and user equipment perform beam communication. In addition, the user equipment is user equipment that can be covered by a transmit beam of the base station. The user equipment may be an activated user, that is, a user that has accessed a transmit beam of the base station, or may be an inactivated user, that is, a user that has not accessed any transmit beam of the base station. According to the method in the embodiments of the present application, efficiency of performing, by a base station, scanning and alignment together with an activated user, that is, a user that has accessed a beam, can be improved, and a time for accessing a system by an inactivated user, that is, a user that has not accessed a beam, can be reduced. The following provides detailed descriptions with reference to FIG. 1 to FIG. 20.

Figure 1:
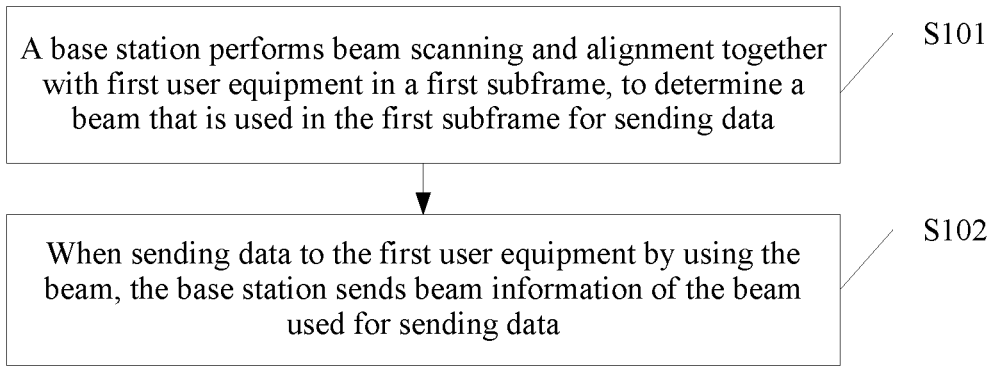
FIG. 1 is a schematic flowchart of a first embodiment of a communication method according to the present application.

Referring to FIG. 1, FIG. 1 is a schematic flowchart of a first embodiment of a communication method according to the present application. In this embodiment, the method includes the following steps.

S101. A base station performs beam scanning and alignment together with first user equipment in a first subframe, to determine a beam that is used for sending data in the first subframe.

A quantity of beams used for sending data is greater than or equal to 1.

If the quantity of beams that are used for sending data in the first subframe is greater than 1, and the beam used for sending data is switched from a first beam to a second beam, when beam information is being sent, the beam information carried in a time-frequency resource needs to be switched to beam information of the second beam. Likewise, if the beam used for sending data is switched from the second beam to a third beam, when the beam information is being sent, the beam information carried in the time-frequency resource is switched to beam information of the third beam.

S102. When sending data to the first user equipment by using the beam, the base station sends beam information of the beam used for sending data.

The beam information includes at least identification information of the beam and a synchronization signal.

The synchronization signal is used by second user equipment to synchronize with the base station.

The identification information of the beam is used by the first user equipment and the second user equipment to identify the beam sent by the base station.

Optionally, the identification information of the beam may be a simple beam number, or may be another code used for identifying the beam. This is not limited in this embodiment of the present application.

The first user equipment is user equipment that has accessed the base station, and the first user equipment already can perform data transmission with the base station. The second user equipment is user equipment that is to access the base station. The second user equipment may determine, after receiving one or more pieces of beam information, which beam is an optimal access beam, and feed back information about the optimal beam to the base station. Then, the base station may schedule a beam to the second user equipment according to the information about the optimal beam, so that the second user equipment can also perform data communication with the base station.

As beam information carried when a base station sends data to first UE is also sent to second UE, when the base station and the first UE perform scanning and alignment in a next subframe, some or all of scheduled beams may not be scanned repeatedly any longer. This helps to reduce a scanning time, and reduce time-frequency resources occupied during scanning. In addition, as the second UE can receive the beam information when the base station and the first UE perform data transmission, the second UE can learn, according to the beam information, an accessible beam, thereby facilitating quick access of the second UE.

Figure 2:
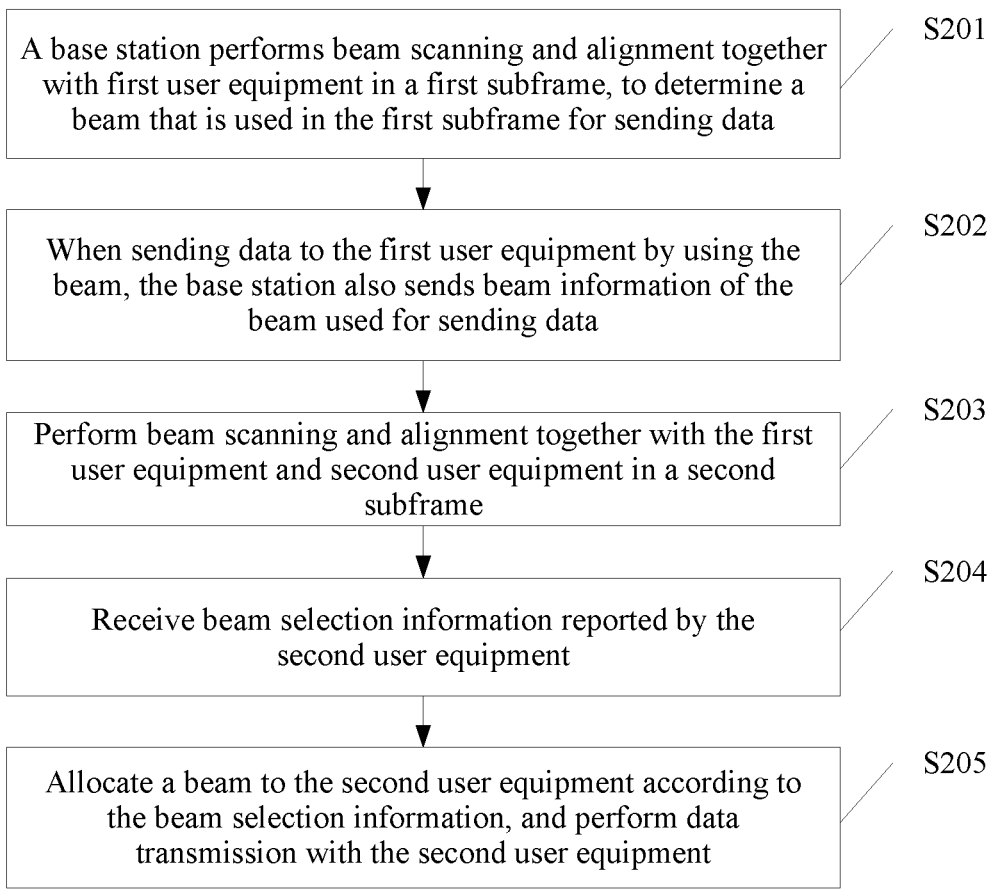
FIG. 2 is a schematic flowchart of a second embodiment of a communication method according to the present application.

Referring to FIG. 2, FIG. 2 is a schematic flowchart of a second embodiment of a communication method according to the present application. In this embodiment, the method includes the following steps.

S201. A base station performs beam scanning and alignment together with first user equipment in a first subframe, to determine a beam that is used for sending data in the first subframe.

A quantity of beams used for sending data is greater than or equal to 1.

If the quantity of beams that are used for sending data in the first subframe is greater than 1, and the beam used for sending data is switched from a first beam to a second beam, when beam information is being sent, the beam information carried in a time-frequency resource needs to be switched to beam information of the second beam. Likewise, if the beam used for sending data is switched from the second beam to a third beam, when the beam information is being sent, the beam information carried in the time-frequency resource is switched to beam information of the third beam.

Optionally, the first subframe may be a subframe in which the base station performs scanning and alignment together with the first UE for the first time, or may be a subframe in any time domain in a scanning and alignment phase.

Beam scanning and alignment may be performed periodically. An object of scanning and alignment may include UE that has accessed a beam and UE that has not accessed a beam. Beam scanning for the UE that has accessed a beam is to determine whether the beam needs to be switched, and beam scanning for the UE that has not accessed a beam is to enable the access.

Optionally, if no beam used for transmitting data is scheduled before a first subframe period, the base station needs to scan, in the first subframe, all beams that can be used for transmitting data. After synchronizing with the base station, the UE identifies a corresponding beam number, that is, beam identification information, by demodulating the beam information, and may optionally obtain beam quality information of the beam by means of demodulation. The beam quality information is used to indicate channel status quality corresponding to the beam. The beam quality information herein may include but is not limited to any one or more of the following:

a signal-to-noise ratio SNR for short), a signal to interference plus noise ratio (SINR), or signal energy.

S202. When sending data to the first user equipment by using the beam, the base station sends beam information of the beam used for sending data.

The beam information includes at least identification information of the beam and a synchronization signal.

The synchronization signal is used by second user equipment to synchronize with the base station.

The identification information of the beam is used by the first user equipment and the second user equipment to identify the beam sent by the base station.

Optionally, the identification information of the beam may be a simple beam number, or may be another code used for identifying the beam. This is not limited in this embodiment of the present application.

S203. Perform beam scanning and alignment together with the first user equipment and second user equipment in a second subframe.

The first user equipment is user equipment that has accessed the base station, and the first user equipment already can perform data transmission with the base station. The second user equipment is user equipment that is to access the base station. The second user equipment may determine, after receiving one or more pieces of beam information, which beam is an optimal access beam, and feed back information about the optimal beam to the base station. Then, the base station may schedule a beam to the second user equipment according to the information about the optimal beam, so that the second user equipment can also perform data communication with the base station.

A scanned beam does not include at least a beam that is scheduled for sending data in the first subframe. The second subframe is a next subframe of the first subframe.

That is, in a scanning phase of the second subframe, all or some beams that have been scheduled in a transmission phase of the first subframe are not repeatedly scanned any longer. This can reduce a scanning time.

Likewise, if a beam used for transmitting data is scheduled before the first subframe period, the base station may scan, in the first subframe, at least one beam that is not scheduled for sending data in a last subframe. However, in a next subframe of the second subframe, that is, a third subframe, the base station needs to scan, in the first subframe and the second subframe, at least one beam that is not scheduled for sending data in the first subframe and the second subframe.

Figure 5:
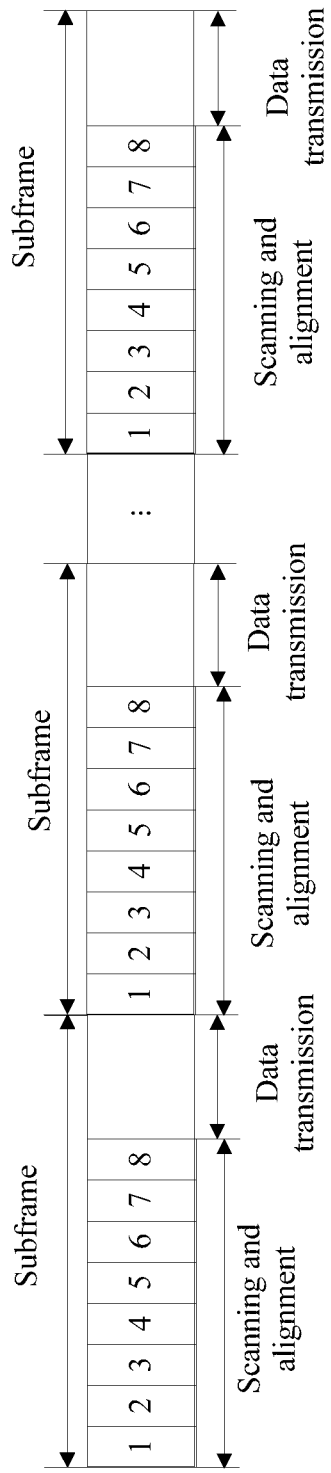
FIG. 5 is a schematic structural diagram of a frame used for scanning and alignment and data transmission.
Figure 6:
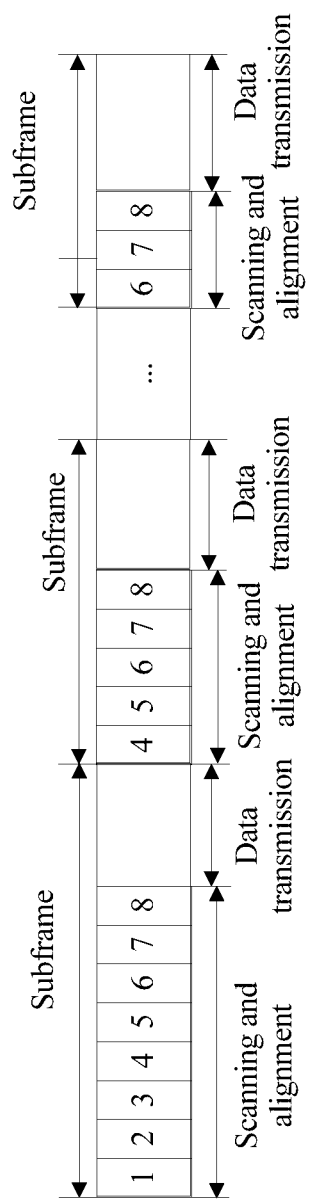
FIG. 6 is a schematic structural diagram of a frame used for scanning and alignment and data transmission according to an embodiment of the present application.
Figure 7:
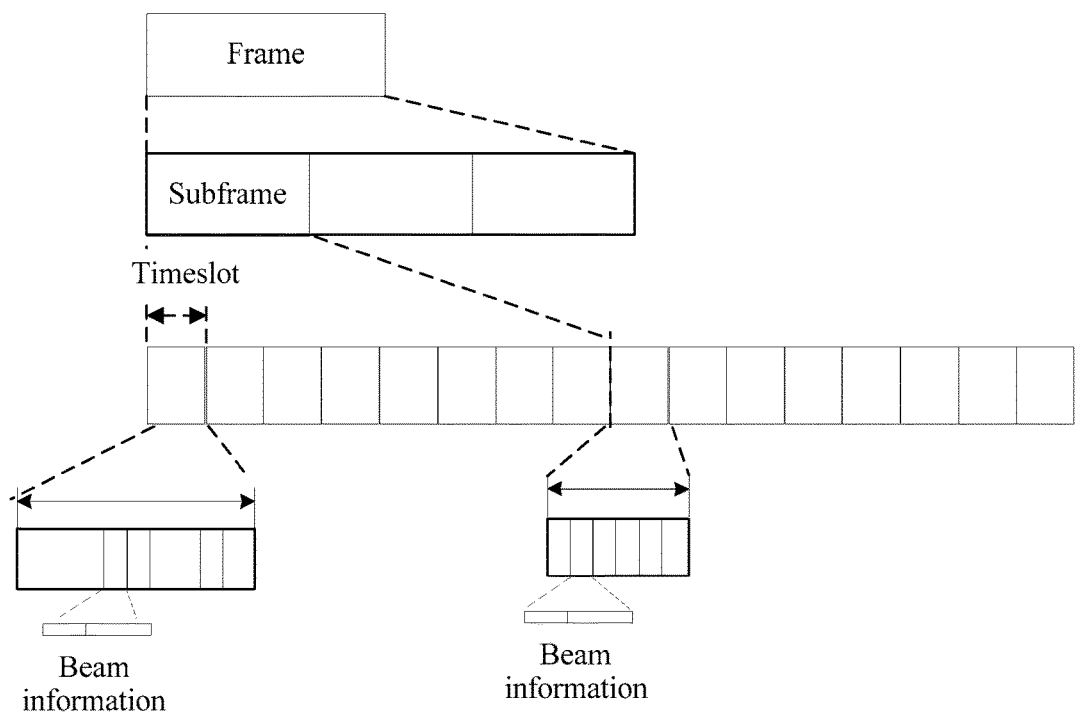
FIG. 7 is a schematic structural diagram of a frame that is used in an LTE architecture for carrying beam information according to an embodiment of the present application.

For example, referring to FIG. 5 and FIG. 6, FIG. 5 and FIG. 6 are respectively a schematic structural diagram of a frame used for scanning and alignment and data transmission, and a schematic structural diagram of a frame used for scanning and alignment and data transmission according to an embodiment of the present application. As shown in FIG. 5, high-frequency narrow beam communication generally includes a scanning and alignment phase and a data transmission phase. The scanning and alignment phase is used for narrow beam scanning and alignment, and each beam carries corresponding beam information. In the data transmission phase, communication is performed by using a beam obtained after scanning and alignment. If scanning needs to be performed in a total of eight directions, beam switching needs to be performed for eight times in each subframe. If there are two orthogonal frequency division multiplexing (OFDM for short) symbols in each beam that are used for sending beam information for scanning, 16 OFDM symbols need to be fixedly allocated to each subframe in this process.

However, in this embodiment of the present application, referring to FIG. 6, traversing is performed in all eight directions in the first subframe period, 16 OFDM symbols are allocated for scanning, and beams of numbers 1 to 3 are sent in a data transmission phase of the first subframe. The same as a beam sent in a scanning phase, beam information is inserted into all the beams of numbers 1 to 3. Therefore, not all beams of numbers 1 to 8 need to be scanned in a scanning phase of the second subframe, only beams of numbers 4 to 8 need to be scanned, and only 10 OFDM symbols need to be allocated for beam scanning, so that overheads are reduced. Likewise, beams of numbers 1 to 5 are sent in a data transmission phase of the second subframe. Therefore, only beams of numbers 6 to 8 need to be scanned in a scanning phase of the third subframe, and only six OFDM symbols need to be allocated. Certainly, some beams that are scheduled for sending data in the first subframe may also be scanned in the second subframe. A scanning time can be reduced compared with that in the prior art, provided that not all the beams are scanned.

In conclusion, when each beam is being sent, information about the beam is inserted into a time-frequency resource block, so that there is no need to traverse all beams in each subframe period. This reduces a time spent on scanning and alignment, decreases a quantity of beam switching times, and ensures that all the beams can be transmitted periodically, thereby facilitating subsequent access of a new user. A scanning period is dynamically adjusted with reference to a historical beam sending status, and there is no need to configure a fixed scanning period. This can greatly reduce a timeslot length occupied by a scanning period in an entire frame structure, thereby reducing resource overheads.

Optionally, the beam used for sending data may be a single beam, or may be two or more beams.

If the quantity of beams used for sending data is greater than 1, when beam information is being sent, the beam information carried in a time-frequency resource may be switched to beam information of a currently used beam according to the currently used beam, so as to ensure that when performing communication with the base station, the UE can accurately receive the beam information of the currently used beam.

A frame in an LTE architecture is used as an example. A schematic structural diagram of a frame that is used in an LTE architecture for carrying beam information in this embodiment of the present application may be shown in FIG. 7. One frame includes several subframes, each subframe includes several timeslots, and the beam information may be carried in a timeslot.

For the synchronization signal and the beam identification information included in the beam information, the synchronization signal and the identification information in the beam information may be located in different fields in a same subframe or located in a same field in a same subframe. When the synchronization signal and the identification information are located in different fields, that is, the two are set independently for the first UE to obtain step by step, specifically, the first user equipment may first synchronize with a transmit end of the base station by using the synchronization signal, and then obtain the beam identification information by means of demodulation. Synchronization signals of all beams may be the same or different, and identification information of all beams differ from each other.

Alternatively, the synchronization signal and the identification information in the beam information may be located in a same field in a same subframe. That is, the synchronization information and the beam identification information may be set together for the first user equipment to obtain simultaneously. For example, one sequence may be used for detection of both the synchronization signal and the beam identification information. The first UE obtains the synchronization signal and the beam identification information by means of demodulation at a time.

Specifically, when the beam information is being stored, the beam information may be stored in a preset fixed resource block; or a storage location of the beam information is indicated by the base station.

Figure 8:
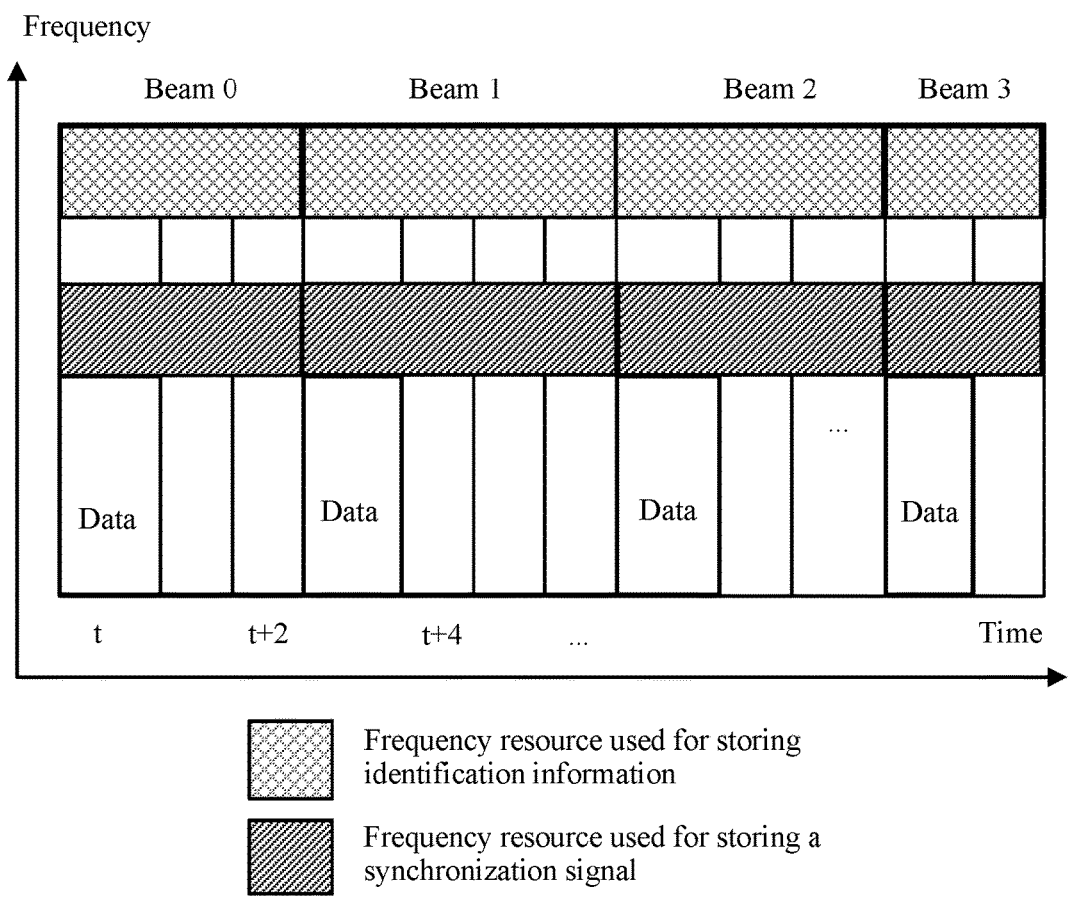
FIG. 8 is a schematic diagram of time-frequency resource setting in a first implementation manner of storing beam information according to the present application.
Figure 9:
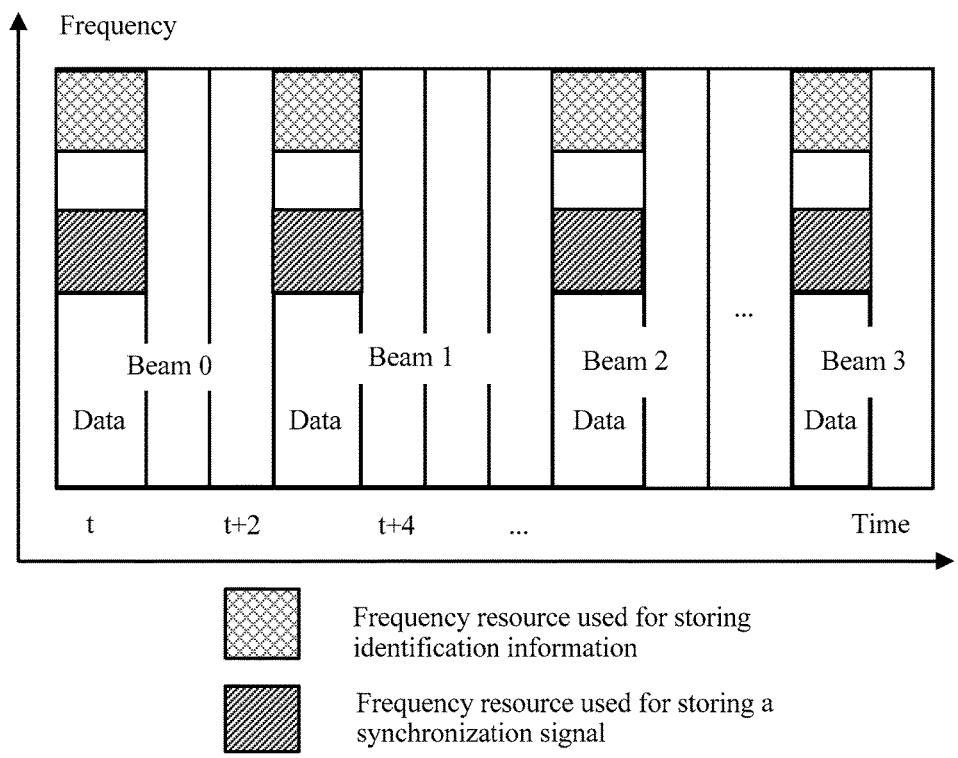
FIG. 9 is a schematic diagram of time-frequency resource setting in a second implementation manner of storing beam information according to the present application.

Referring to FIG. 8 to FIG. 12, FIG. 8 to FIG. 12 are respectively corresponding to schematic diagrams of time-frequency resource setting in a first to a fifth implementation manners of storing beam information. FIG. 8 to FIG. 11 show a scenario in which the beam information is stored in a preset fixed resource block, and may include the following cases:

As shown in FIG. 8 and FIG. 9, in a multi-carrier system, preset contiguous or non-contiguous frequency resources are selected to store the beam information. As shown in FIG. 8, a horizontal coordinate represents a time, a vertical coordinate represents a frequency, a crossed stripe represents beam identification information, and a unidirectional oblique stripe represents a synchronization signal. In a process of sending data on a beam 0 to a beam 3, synchronization signals and beam identification information both are stored in contiguous frequency bands. As shown in FIG. 9, a horizontal coordinate represents a time, a vertical coordinate represents a frequency, a crossed stripe represents beam identification information, and a unidirectional oblique stripe represents a synchronization signal. In a process of sending data on a beam 0 to a beam 3, synchronization signals and beam identification information both are stored in non-contiguous frequency bands.

Figure 10:
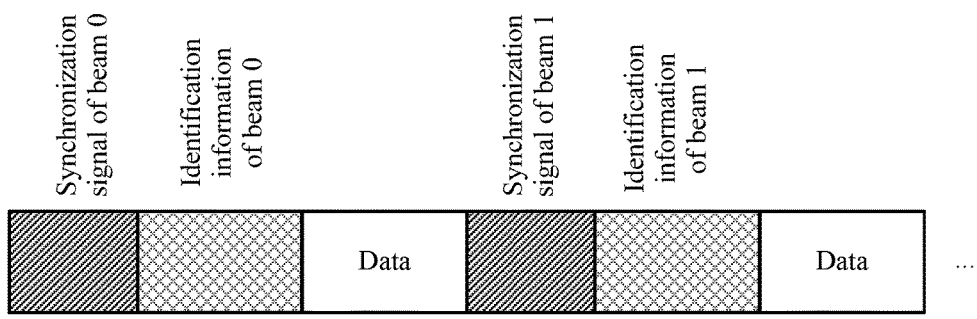
FIG. 10 is a schematic diagram of time-frequency resource setting in a third implementation manner of storing beam information according to the present application.

Alternatively, as shown in FIG. 10, in a single carrier system, the beam information is stored in different time segments. A unidirectional oblique stripe represents a synchronization signal, a crossed stripe represents beam identification information, and a blank part is a data part. Beam information of a beam 0 and beam information of a beam 1 are sequentially stored in different time segments. The first UE first receives a synchronization signal for synchronization, and then obtains beam identification information by means of demodulation.

Figure 11:
FIG. 11 is a schematic diagram of time-frequency resource setting in a fourth implementation manner of storing beam information according to the present application.

Alternatively, as shown in FIG. 11, the beam information is stored in a data field. The first field in the data field identifies beam identification information, the next field indicates a packet length, and the last field indicates a modulation scheme. A location of the beam identification information in the data field may be fixed, or may be notified by the base station to the first UE.

Figure 12:
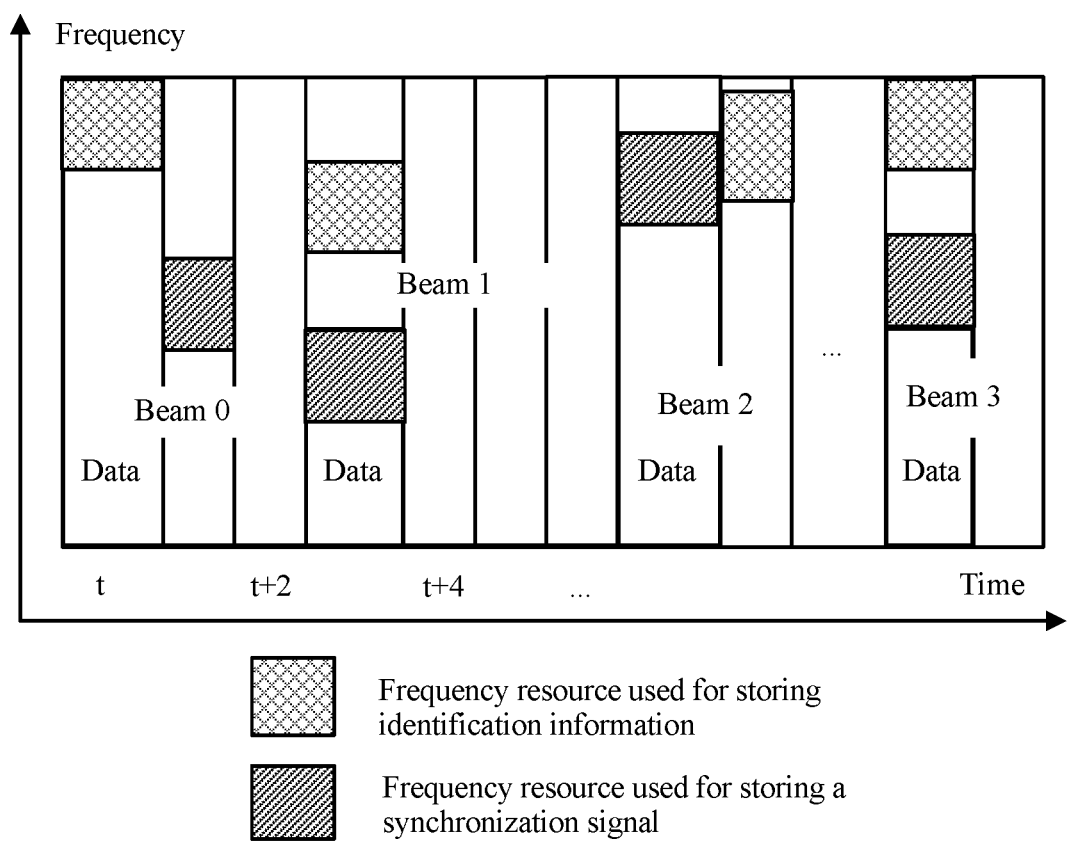
FIG. 12 is a schematic diagram of time-frequency resource setting in a fifth implementation manner of storing beam information according to the present application.

Alternatively, as shown in FIG. 12, a storage location of the beam information is indicated by the base station. A crossed stripe represents beam identification information, and an oblique stripe is a synchronization signal. A storage location of beam information corresponding to each of a beam 0 to a beam 3 may be indicated randomly. The base station determines the storage location and then notifies the first UE.

Specifically, the base station may notify in advance a time-frequency resource location or a data field location for storing beam information corresponding to each beam. The beam information is dynamically stored at a specific location in a beam switching process in a scanning and alignment phase and a data transmission phase, so as to facilitate receiving and demodulation by the first UE. A manner, mentioned herein, of notifying the first UE by the base station may be notifying the first UE by using a low-frequency communication channel or may be another existing manner. This is not limited in this embodiment of the present application.

The foregoing storage manner is applicable to a case in which the synchronization signal and the beam identification information are set independently, and is also applicable to a case in which the two are set together.

S204. Receive beam selection information reported by the second user equipment.

After scanning and alignment are completed, the UE reports detected information, to help the base station end to complete resource scheduling (which may include beam resource scheduling and idle time domain resource scheduling) and access of a new user. A reporting manner may be a random access manner in a Long Term Evolution (Long Term Evolution, LTE for short) technology, or may be a conversional low frequency network access manner. This is not limited in this embodiment of the present application.

The beam selection information is generated by the second user equipment according to the beam information sent by the base station and the demodulated beam quality information, and includes beam identification information of an optimal beam and beam quality information of the optimal beam, where the optimal beam is obtained after the second user equipment performs comparison according to the beam quality information.

S205. Allocate a beam to the second user equipment according to the beam selection information, and perform data transmission with the second user equipment.

After the first UE and the base station complete data transmission, if the second UE wants to connect to a system at this time, the second UE may generate the beam selection information according to the beam information sent by the base station. The beam selection information is generated by the second user equipment according to the beam information sent by the base station and the demodulated beam quality information, and includes beam identification information of an optimal beam and beam quality information of the optimal beam, where the optimal beam is obtained after the second user equipment performs comparison according to the beam quality information.

Then, the base station allocates a beam to the second user equipment according to the beam selection information, and performs data transmission with the second user equipment.

Specific application scenarios may be divided into two types. To show a beam quality comparison process, third UE is introduced and is described with reference to FIG. 13A and FIG. 13B, and FIG. 14A and FIG. 14B.

Figure 13A:
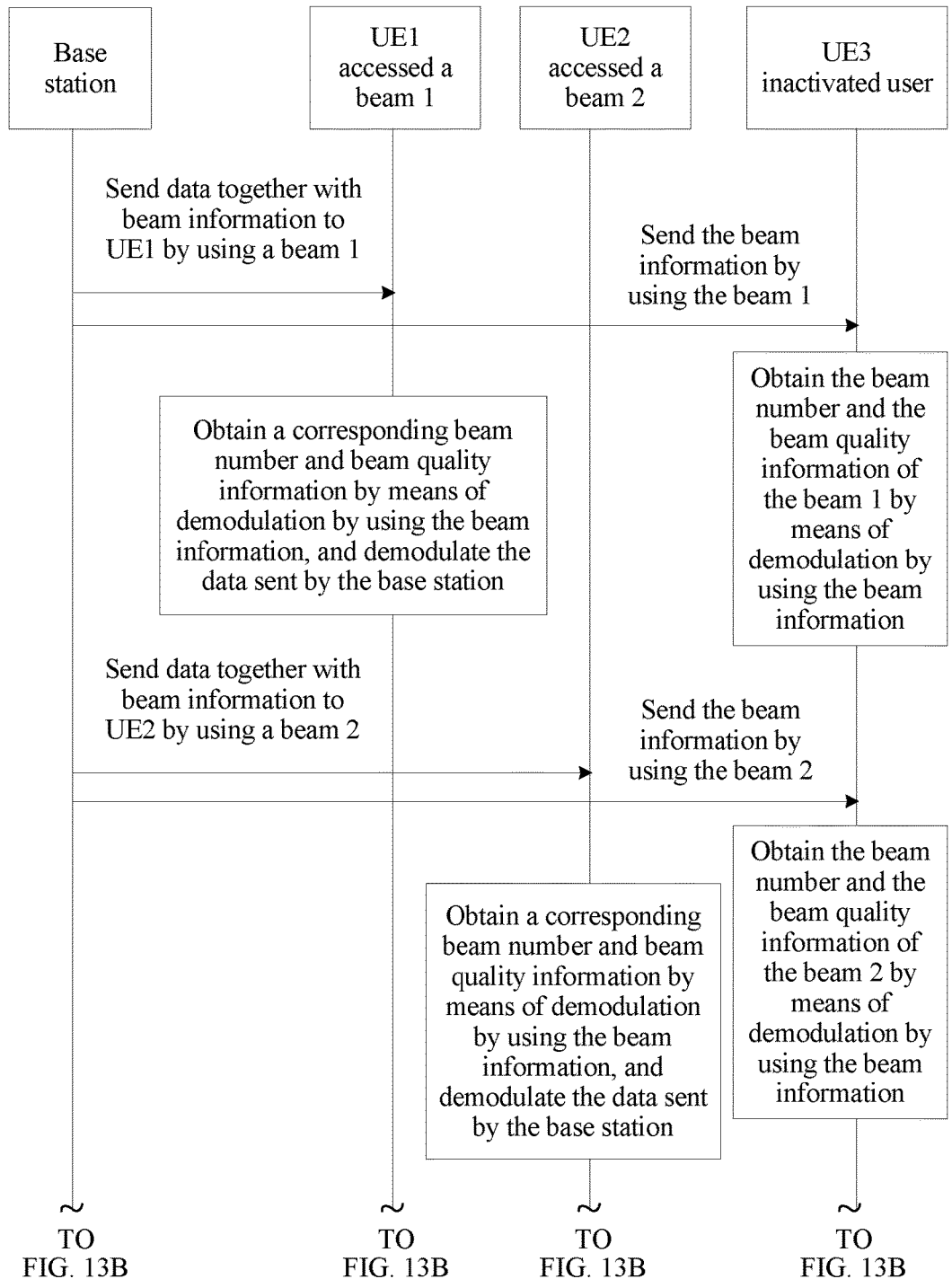
FIG. 13A and FIG. 13B are a schematic flowchart of a first embodiment of access of a new user in a communication method according to the present application.
Figure 13B:
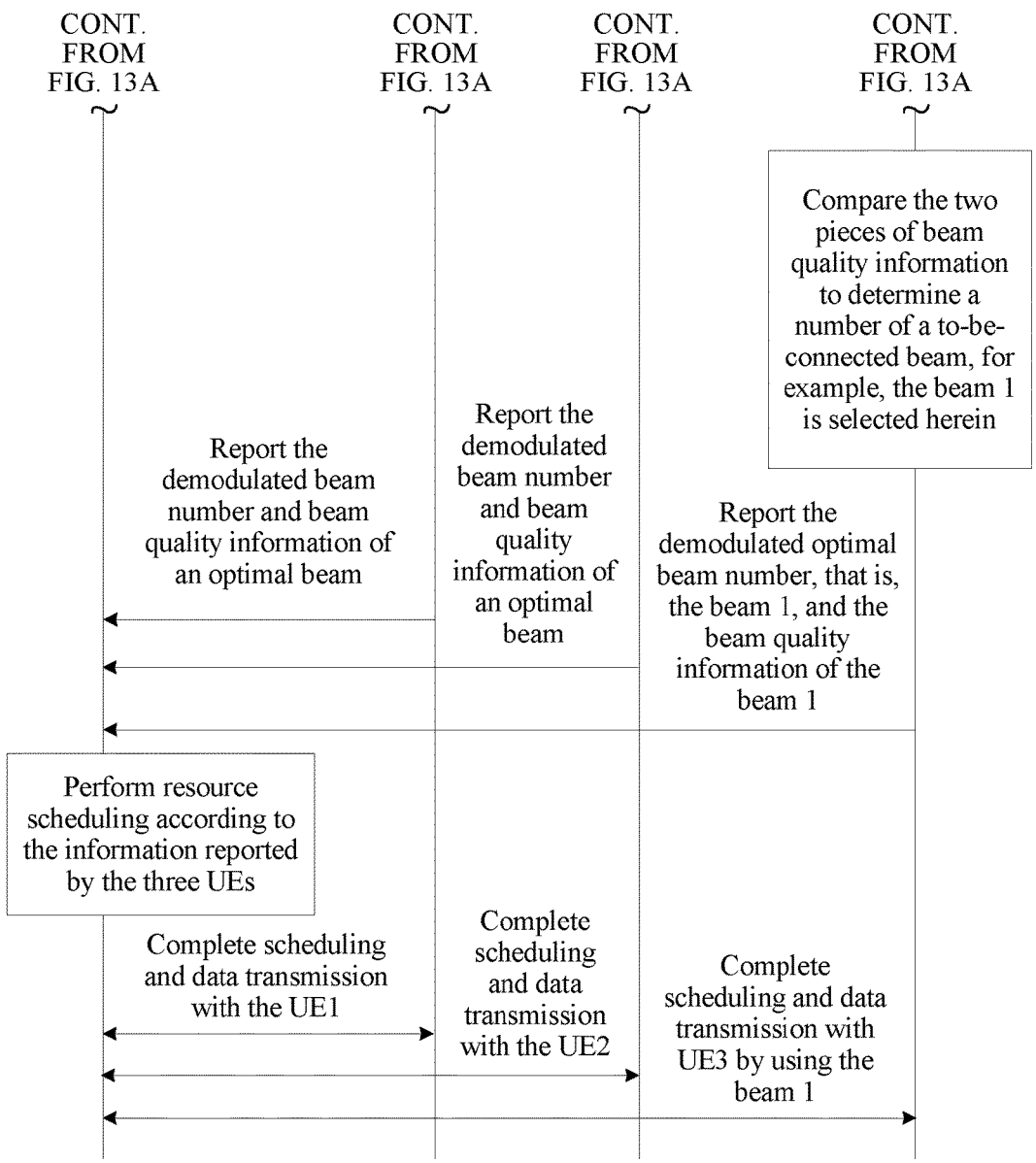

Referring to FIG. 13A and FIG. 13B, FIG. 13A and FIG. 13B are a schematic flowchart of a first embodiment of access of a new user in a communication method according to the present application. In this embodiment, for scheduling for UE located in coverage of two beams, it is assumed that UE1 has accessed a beam 1, UE2 has accessed a beam 2 (the UE1 and the UE2 are activated users), UE3 is an inactivated user, and the UE3 is located in coverage of both the beam 1 and the beam 2. It is desired that an optimal UE3 access process is implemented without adding a beam.

As shown in FIG. 13A and FIG. 13B, the method includes the following steps.

1. A base station sends data together with beam information to the UE1 by using the beam 1.

2. The UE1 obtains, by means of demodulation by using the beam information, a corresponding beam number, that is, beam identification information, beam quality information, and the data that is sent by the base station.

3. The base station also sends the beam information to the UE3 by using the beam 1.

4. The UE3 obtains the beam identification information and the beam quality information of the beam 1 by means of demodulation by using the beam information.

5. The base station sends data together with beam information to the UE2 by using the beam 2.

6. The UE2 obtains, by means of demodulation by using the beam information, a corresponding beam number, that is, beam identification information, beam quality information, and the data that is sent by the base station.

7. The base station also sends the beam information to the UE3 by using the beam 2.

8. The UE3 obtains the beam identification information and the beam quality information of the beam 2 by means of demodulation by using the beam information.

9. The UE3 compares the two pieces of beam quality information to determine a number of a beam for access, for example, the beam 1 is selected herein for access.

10. The UE1 reports the demodulated beam number and beam quality information of an optimal beam.

11. The UE2 reports the demodulated beam number and beam quality information of an optimal beam.

12. The UE3 reports the demodulated beam number and beam quality information of an optimal beam.

13. The base station performs resource scheduling according to the information reported by the three UEs.

14. The base station completes scheduling and data transmission with the UE1.

15. The base station completes scheduling and data transmission with the UE2.

16. The base station completes scheduling and data transmission with the UE3 by using the beam 1.

Figure 14A:
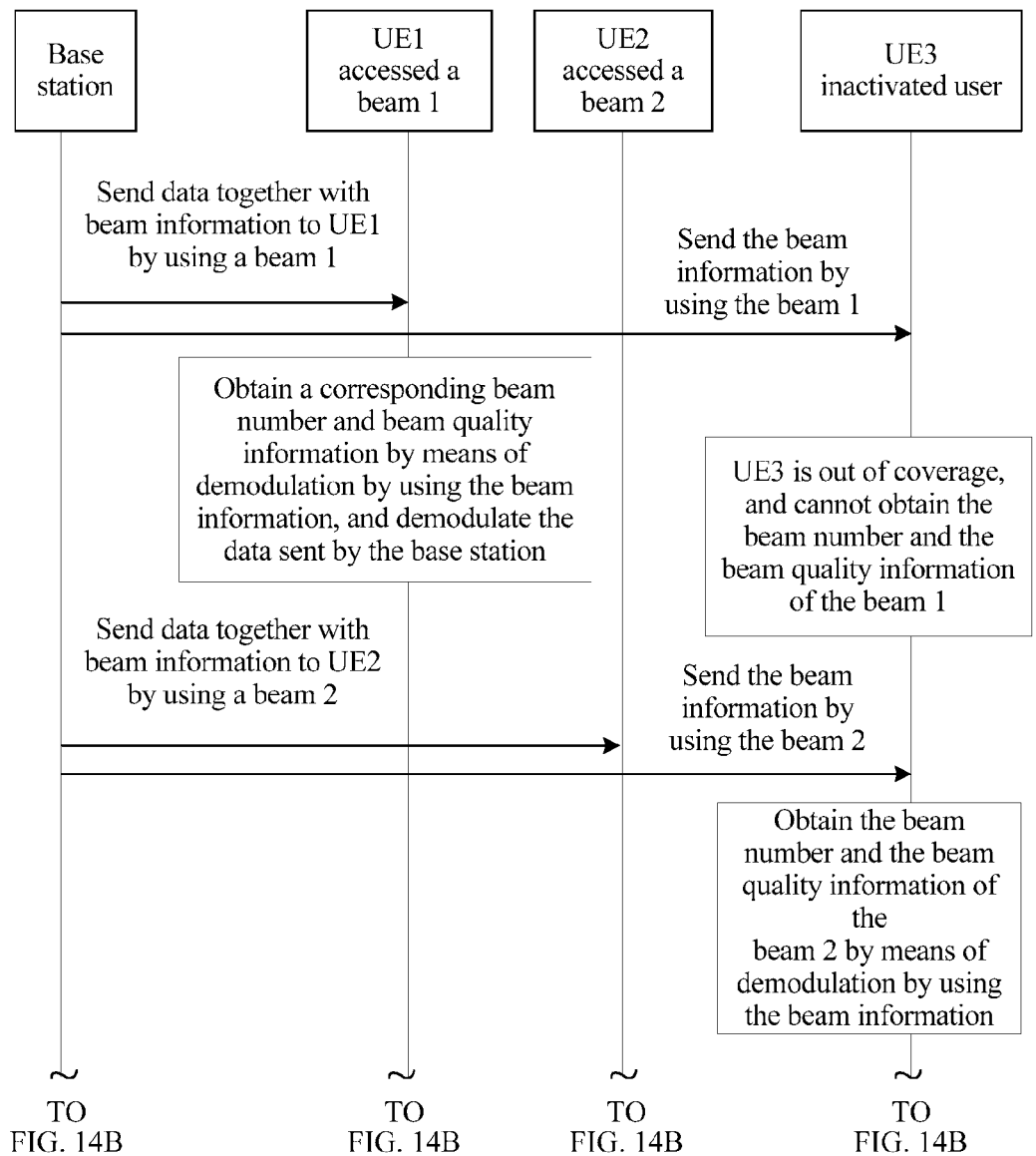
FIG. 14A and FIG. 14B are a schematic flowchart of a second embodiment of access of a new user in a communication method according to the present application.
Figure 14B:
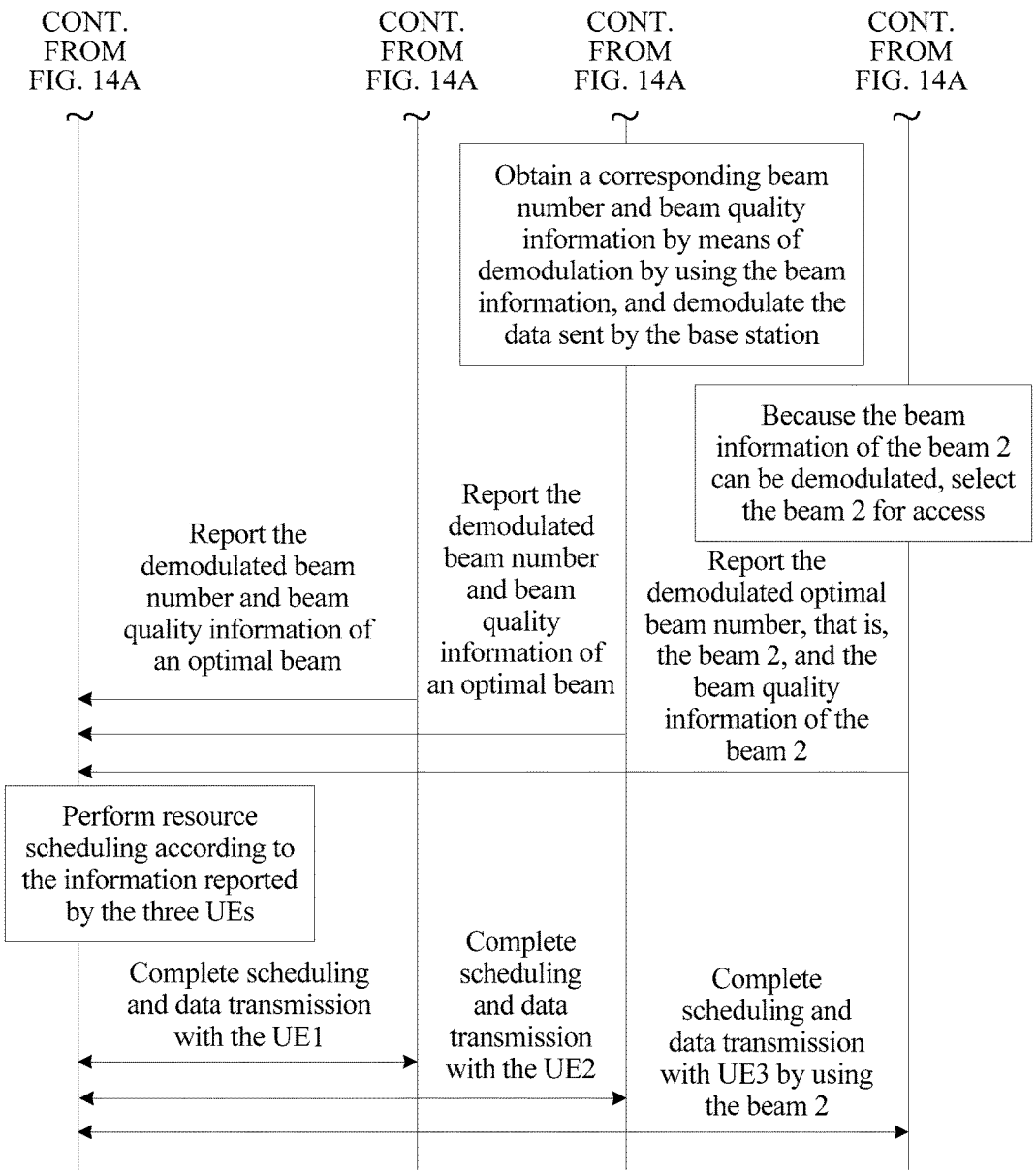

Referring to FIG. 14A and FIG. 14B, FIG. 14A and FIG. 14B are a schematic flowchart of a second embodiment of access of a new user in a communication method according to the present application. In this embodiment, for scheduling for UE located in coverage of two beams, it is assumed that UE1 has accessed a beam 1, UE2 has accessed a beam 2 (the UE1 and the UE2 are activated users), UE3 is an inactivated user, and the UE3 is located in a coverage area of the beam 2 but is not located in a coverage area of the beam 1. It is desired that an optimal UE3 access process is implemented without adding a beam.

As shown in FIG. 14A and FIG. 14B, the method includes the following steps.

1. A base station sends data together with beam information to the UE1 by using the beam 1.

2. The UE1 obtains, by means of demodulation by using the beam information, a corresponding beam number, that is, beam identification information, beam quality information, and the data that is sent by the base station.

3. The base station also sends the beam information to the UE3 by using the beam 1.

4. Because the UE3 is not in the coverage area of the beam 1, the UE3 cannot obtain the beam number and the beam quality information of the beam 1 by means of demodulation by using the beam information.

5. The base station sends data together with beam information to the UE2 by using the beam 2.

6. The UE2 obtains, by means of demodulation by using the beam information, a corresponding beam number, that is, beam identification information, beam quality information, and the data that is sent by the base station.

7. The base station also sends the beam information to the UE3 by using the beam 2.

8. The UE3 obtains the beam identification information and the beam quality information of the beam 2 by means of demodulation by using the beam information.

9. The UE3 selects the beam 2 for access.

10. The UE1 reports the demodulated beam number and beam quality information of an optimal beam.

11. The UE2 reports the demodulated beam number and beam quality information of an optimal beam.

12. The UE3 reports the demodulated beam number and beam quality information of an optimal beam.

13. The base station performs resource scheduling according to the information reported by the three UEs.

14. The base station completes scheduling and data transmission with the UE1.

15. The base station completes scheduling and data transmission with the UE2.

16. The base station completes scheduling and data transmission with the UE3 by using the beam 2.

According to the manners described in FIG. 13A and FIG. 13B, and FIG. 14A and FIG. 14B, a message carrying beam information is sent, in a phase in which data is transmitted to UE1 and UE2, to UE3 that has not accessed a beam, so that quick access of an inactivated user can be implemented. Because no additional beam information needs to be sent, resource overheads are reduced and access efficiency of a new user is improved.

Figure 3:
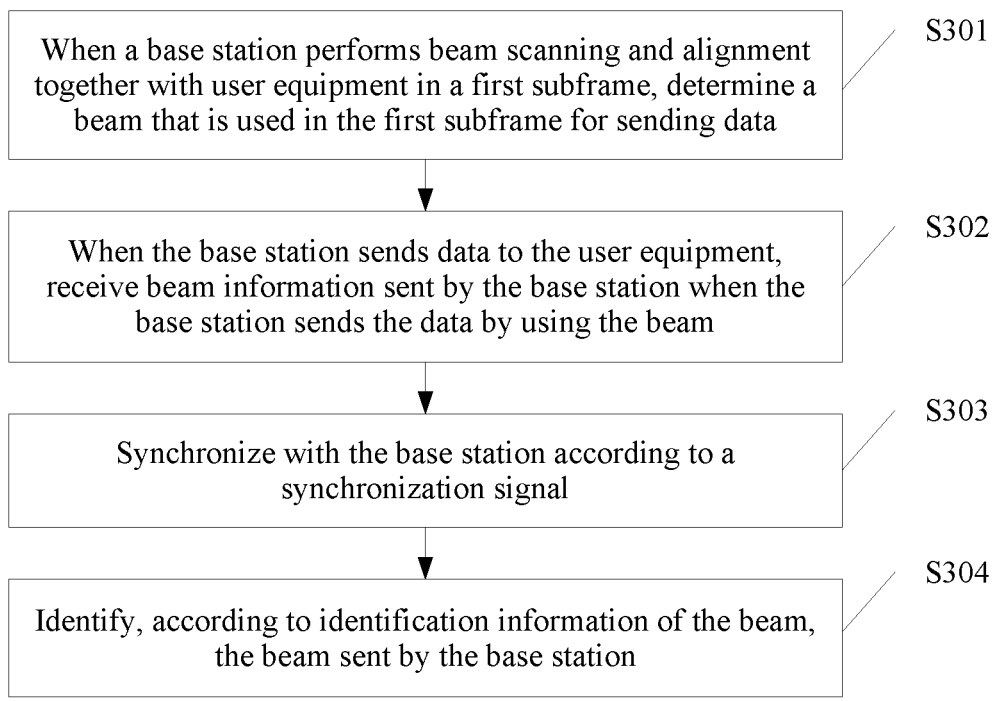
FIG. 3 is a schematic flowchart of a third embodiment of a communication method according to the present application.

Referring to FIG. 3, FIG. 3 is a schematic flowchart of a third embodiment of a communication method according to the present application. In this embodiment, the method includes the following steps.

S301. When a base station performs beam scanning and alignment together with user equipment in a first subframe, determine a beam that is used for sending data in the first subframe.

The first subframe may be a subframe in which the base station performs scanning and alignment together with the UE for the first time, or may be a subframe in any time domain in a scanning and alignment phase.

S302. When the base station sends data to the user equipment, receive beam information sent by the base station when the base station sends the data by using the beam.

The beam information includes at least identification information of the beam and a synchronization signal.

S303. Synchronize with the base station according to the synchronization signal.

S304. Identify, according to the identification information of the beam, the beam sent by the base station.

Optionally, the synchronization signal and the identification information in the beam information are located in different fields in a same subframe or located in a same field in a same subframe.

That is, the synchronization signal and the identification information in the beam information may be set independently for the user equipment to obtain step by step; or the synchronization signal and the identification information in the beam information may be set together for the user equipment to obtain simultaneously.

Optionally, the identification information of the beam may be a simple beam number, or may be another code used for identifying the beam. This is not limited in this embodiment of the present application.

Figure 4:
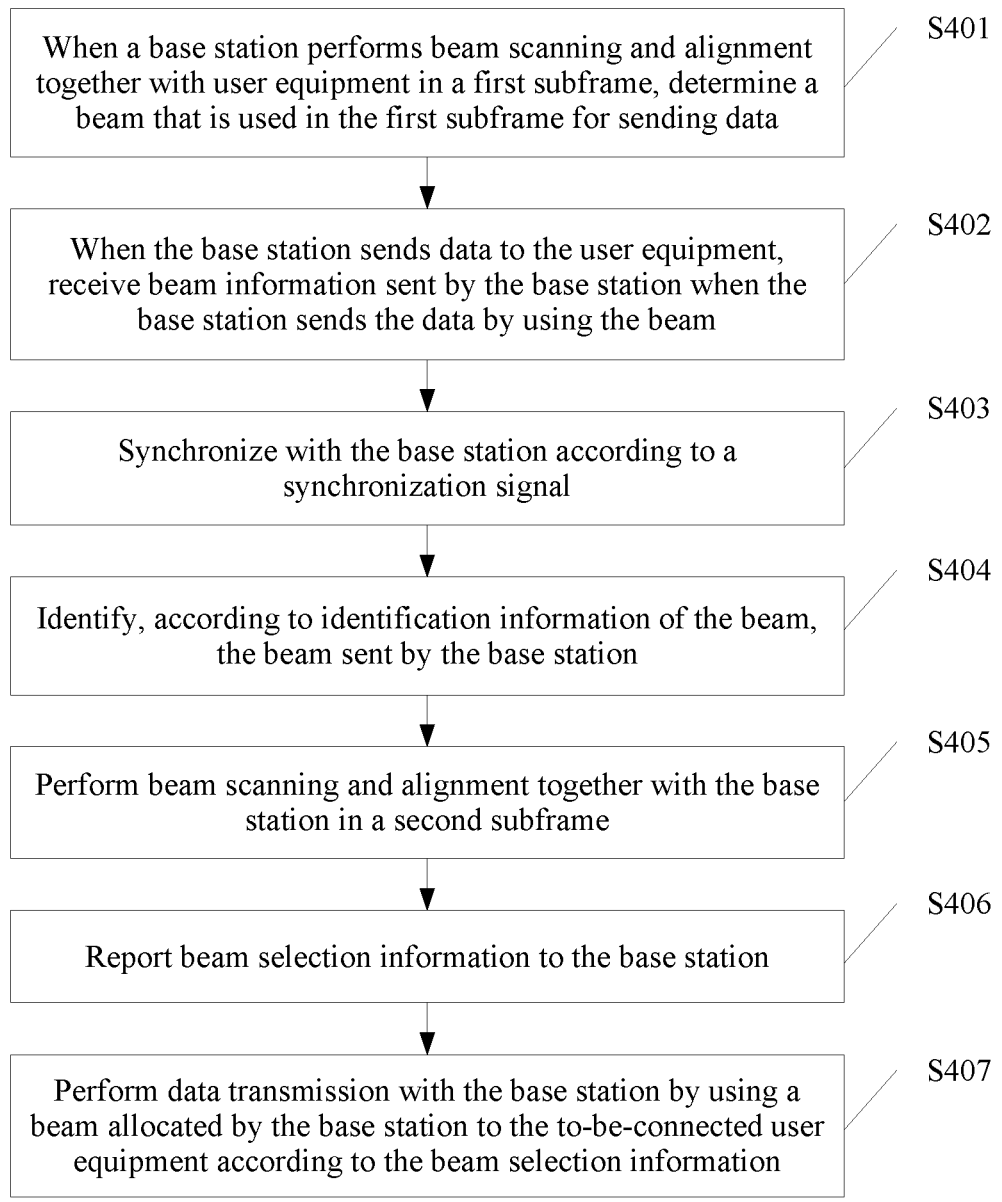
FIG. 4 is a schematic flowchart of a fourth embodiment of a communication method according to the present application.

Referring to FIG. 4, FIG. 4 is a schematic flowchart of a fourth embodiment of a communication method according to the present application. In this embodiment, the method includes the following steps.

S401. When a base station performs beam scanning and alignment together with user equipment in a first subframe, determine a beam that is used for sending data in the first subframe.

The first subframe may be a subframe in which the base station performs scanning and alignment together with the first UE for the first time, or may be a subframe in any time domain in a scanning and alignment phase.

S402. When the base station sends data to the user equipment, receive beam information sent by the base station when the base station sends the data by using the beam.

The beam information includes at least identification information of the beam and a synchronization signal.

S403. Synchronize with the base station according to the synchronization signal.

S404. Identify, according to the identification information of the beam, the beam sent by the base station.

S405. Perform beam scanning and alignment together with the base station in a second subframe.

A scanned beam does not include at least a beam that is scheduled for sending data in the first subframe. The second subframe is a next subframe of the first subframe.

S406. Report beam selection information to the base station.

The beam selection information is generated by the user equipment according to the beam information sent by the base station and demodulated beam quality information, and includes beam identification information of an optimal beam and beam quality information of the optimal beam, where the optimal beam is obtained after the user equipment performs comparison according to the beam quality information.

S407. Perform data transmission with the base station by using a beam allocated by the base station to the user equipment according to the beam selection information.

Figure 15:
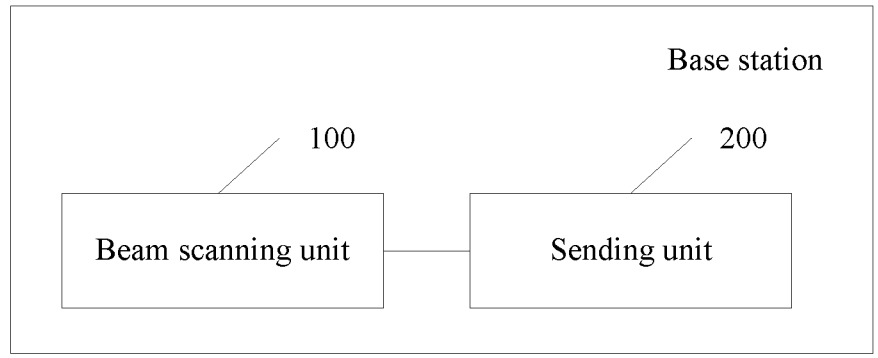
FIG. 15 is a schematic composition diagram of a first embodiment of a base station according to the present application.

Referring to FIG. 15, FIG. 15 is a schematic composition diagram of a first embodiment of a base station according to the present application. In this embodiment, the base station includes:

a beam scanning unit 100, configured to perform beam scanning and alignment together with first user equipment in a first subframe, to determine a beam that is used for sending data in the first subframe, where a quantity of beams used for sending data is greater than or equal to 1; and a sending unit 200, configured to send data to the first user equipment by using the beam, and send beam information of the beam, where the beam information includes at least identification information of the beam and a synchronization signal.

The synchronization signal is used by second user equipment to synchronize with the base station.

The identification information of the beam is used by the first user equipment and the second user equipment to identify the beam sent by the base station.

Optionally, the synchronization signal and the identification information in the beam information are located in different fields in a same subframe or located in a same field in a same subframe.

That is, the synchronization signal and the identification information in the beam information are set independently for the first user equipment or the second user equipment to obtain step by step; or the synchronization signal and the identification information in the beam information are set together for the first user equipment or the second user equipment to obtain simultaneously.

Optionally, the beam information is stored in a preset fixed resource block; or the beam information is stored at a storage location specified by the base station.

Optionally, that the beam information is stored in a preset fixed resource block specifically includes:

in a multicarrier system, preset contiguous or non-contiguous frequency resources are selected to store the beam information; or in a single carrier system, the beam information is stored in different time segments; or the beam information is stored in a data field.

Figure 16:
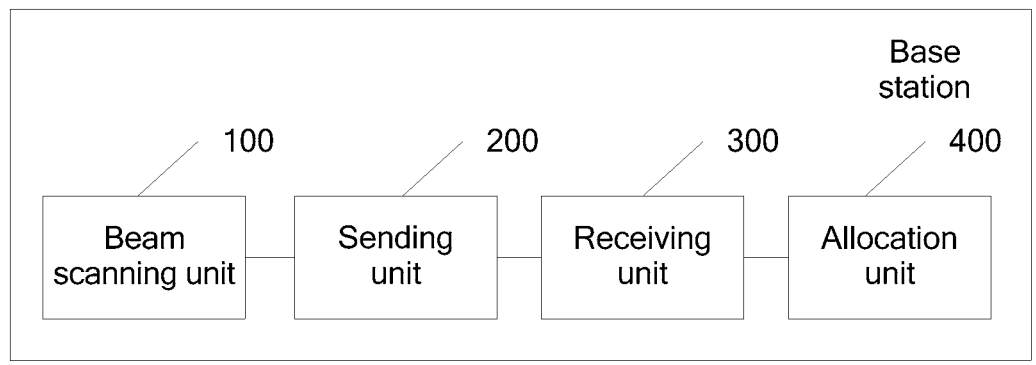
FIG. 16 is a schematic composition diagram of a second embodiment of a base station according to the present application.

Referring to FIG. 16, FIG. 16 is a schematic composition diagram of a second embodiment of a base station according to the present application. In this embodiment, the base station includes: a beam scanning unit 100 and a sending unit 200.

The beam scanning unit 100 is configured to perform beam scanning and alignment together with first user equipment in a first subframe, to determine a beam that is used for sending data in the first subframe.

A quantity of beams used for sending data is greater than or equal to 1.

If the quantity of beams that are used for sending data in the first subframe is greater than 1, and the beam used for sending data is switched from a first beam to a second beam, when beam information is being sent, the beam information carried in a time-frequency resource needs to be switched to beam information of the second beam. Likewise, if the beam used for sending data is switched from the second beam to a third beam, when the beam information is being sent, the beam information carried in the time-frequency resource is switched to beam information of the third beam.

Optionally, the first subframe may be a subframe in which the base station performs scanning and alignment together with the first UE for the first time, or may be a subframe in any time domain in a scanning and alignment phase.

Beam scanning and alignment may be performed periodically. An object of scanning and alignment may include UE that has accessed a beam and UE that has not accessed a beam. Beam scanning for the UE that has accessed a beam is to determine whether the beam needs to be switched, and beam scanning for the UE that has not accessed a beam is to enable the access.

Optionally, if no beam used for transmitting data is scheduled before a first subframe period, the base station needs to scan, in the first subframe, all beams that can be used for transmitting data. After synchronizing with the base station, the UE identifies a corresponding beam number, that is, beam identification information, by demodulating the beam information, and may optionally obtain beam quality information of the beam by means of demodulation. The beam quality information is used to indicate channel status quality corresponding to the beam. The beam quality information herein may include but is not limited to any one or more of the following:

an SNR, an SINR, or signal energy.

The sending unit 200 is configured to send data to the first user equipment by using the beam, and send beam information of the beam.

The beam information includes at least identification information of the beam and a synchronization signal.

The synchronization signal is used by second user equipment to synchronize with the base station.

The identification information of the beam is used by the first user equipment and the second user equipment to identify the beam sent by the base station.

Optionally, the identification information of the beam may be a simple beam number, or may be another code used for identifying the beam. This is not limited in this embodiment of the present application.

Optionally, the base station further includes a receiving unit 300 and an allocation unit 400.

The beam scanning unit 100 is further configured to:

perform beam scanning and alignment together with the first user equipment and the second user equipment in a second subframe, where a scanned beam does not include at least a beam that is scheduled for sending data in the first subframe, and the second subframe is a next subframe of the first subframe.

The first user equipment is user equipment that has accessed the base station, and the first user equipment already can perform data transmission with the base station. The second user equipment is user equipment that is to access the base station. The second user equipment may determine, after receiving one or more pieces of beam information, which beam is an optimal access beam, and feed back information about the optimal beam to the base station. Then, the base station may schedule a beam to the second user equipment according to the information about the optimal beam, so that the second user equipment can also perform data communication with the base station.

In a scanning phase of the second subframe, all or some beams that have been scheduled in a transmission phase of the first subframe are not repeatedly scanned any longer. This can reduce a scanning time.

Likewise, if a beam has been scheduled for transmitting data before the first subframe period, the base station may scan, in the first subframe, at least one beam that is not scheduled for sending data in a last subframe. In a next subframe of the second subframe, that is, a third subframe, the base station needs to scan, in the first subframe and the second subframe, at least one beam that is not scheduled for sending data in the first subframe and the second subframe.

For example, referring to FIG. 5 and FIG. 6, FIG. 5 and FIG. 6 are respectively a schematic structural diagram of a frame used for scanning and alignment and data transmission, and a schematic structural diagram of a frame used for scanning and alignment and data transmission according to an embodiment of the present application. As shown in FIG. 5, high-frequency narrow beam communication generally includes a scanning and alignment phase and a data transmission phase. The scanning and alignment phase is used for narrow beam scanning and alignment, and each beam carries corresponding beam information. In the data transmission phase, communication is performed by using a beam obtained after scanning and alignment. If scanning needs to be performed in a total of eight directions, beam switching needs to be performed for eight times in each subframe. If there are two orthogonal frequency division multiplexing (OFDM for short) symbols in each beam that are used for sending beam information for scanning, 16 OFDM symbols need to be fixedly allocated to each subframe in this process.

However, in this embodiment of the present application, referring to FIG. 6, traversing is performed in all eight directions in the first subframe period, 16 OFDM symbols are allocated for scanning, and beams of numbers 1 to 3 are sent in a data transmission phase of the first subframe. The same as a beam sent in a scanning phase, beam information is inserted into all the beams of numbers 1 to 3. Therefore, not all beams of numbers 1 to 8 need to be scanned in a scanning phase of the second subframe, only beams of numbers 4 to 8 need to be scanned, and only 10 OFDM symbols need to be allocated for beam scanning, so that overheads are reduced. Likewise, beams of numbers 1 to 5 are sent in a data transmission phase of the second subframe. Therefore, only beams of numbers 6 to 8 need to be scanned in a scanning phase of the third subframe, and only six OFDM symbols need to be allocated. Certainly, some beams that are scheduled for sending data in the first subframe may also be scanned in the second subframe. A scanning time can be reduced compared with that in the prior art, provided that not all the beams are scanned.

In conclusion, when each beam is being sent, information about the beam is inserted into a time-frequency resource block, so that there is no need to traverse all beams in each subframe period. This reduces a time spent on scanning and alignment, decreases a quantity of beam switching times, and ensures that all the beams can be transmitted periodically, thereby facilitating subsequent access of a new user. A scanning period is dynamically adjusted with reference to a historical beam sending status, and there is no need to configure a fixed scanning period. This can greatly reduce a timeslot length occupied by a scanning period in an entire frame structure, thereby reducing resource overheads.

The beam used for sending data may be a single beam, or may be two or more beams.

If the quantity of beams used for sending data is greater than 1, when beam information is being sent, the beam information carried in a time-frequency resource may be switched to beam information of a currently used beam according to the currently used beam, so as to ensure that when performing communication with the base station, the UE can accurately receive the beam information of the currently used beam.

A frame in an LTE architecture is used as an example. A schematic structural diagram of a frame that is used in an LTE architecture for carrying beam information in this embodiment of the present application may be shown in FIG. 7. One frame includes several subframes, each subframe includes several timeslots, and the beam information may be carried in a timeslot.

Optionally, the synchronization signal and the identification information in the beam information may be located in different fields in a same subframe or located in a same field in a same subframe.

That is, the synchronization signal and the identification information in the beam information are set independently (located in different fields) for the first user equipment or the second user equipment to obtain step by step; or the synchronization signal and the identification information in the beam information are set together (located in a same field) for the first user equipment or the second user equipment to obtain simultaneously.

For example, the synchronization signal and the identification information may be set independently for the first UE to obtain step by step. Specifically, the first user equipment may first synchronize with a transmit end of the base station by using the synchronization signal, and then obtain the beam identification information by means of demodulation. Synchronization signals of all beams may be the same or different, and identification information of all beams differ from each other.

Alternatively, the synchronization information and the beam identification information may be set together for the first user equipment to obtain simultaneously. For example, one sequence may be used for detection of both the synchronization signal and the beam identification information. The first UE obtains the synchronization signal and the beam identification information by means of demodulation at a time.

Optionally, the beam information is stored in a preset fixed resource block; or the beam information is stored at a storage location specified by the base station.

Optionally, that the beam information is stored in a preset fixed resource block specifically includes:

in a multicarrier system, preset contiguous or non-contiguous frequency resources are selected to store the beam information; or in a single carrier system, the beam information is stored in different time segments; or the beam information is stored in a data field.

Referring to FIG. 8 to FIG. 12, FIG. 8 to FIG. 12 are respectively corresponding to schematic diagrams of time-frequency resource setting in a first to a fifth implementation manners of storing beam information. FIG. 8 to FIG. 11 show a scenario in which the beam information is stored in a preset fixed resource block, and may include the following cases:

As shown in FIG. 8 and FIG. 9, in a multi-carrier system, preset contiguous or non-contiguous frequency resources are selected to store the beam information. As shown in FIG. 8, a horizontal coordinate represents a time, a vertical coordinate represents a frequency, a crossed stripe represents beam identification information, and a unidirectional oblique stripe represents a synchronization signal. In a process of sending data on a beam 0 to a beam 3, synchronization signals and beam identification information both are stored in contiguous frequency bands. As shown in FIG. 9, a horizontal coordinate represents a time, a vertical coordinate represents a frequency, a crossed stripe represents beam identification information, and a unidirectional oblique stripe represents a synchronization signal. In a process of sending data on a beam 0 to a beam 3, synchronization signals and beam identification information both are stored in non-contiguous frequency bands.

Alternatively, as shown in FIG. 10, in a single carrier system, the beam information is stored in different time segments. A unidirectional oblique stripe represents a synchronization signal, a crossed stripe represents beam identification information, and a blank part is a data part. Beam information of a beam 0 and beam information of a beam 1 are sequentially stored in different time segments. The first UE first receives a synchronization signal for synchronization, and then obtains beam identification information by means of demodulation.

Alternatively, as shown in FIG. 11, the beam information is stored in a data field. The first field in the data field identifies beam identification information, the next field indicates a packet length, and the last field indicates a modulation scheme. A location of the beam identification information in the data field may be fixed, or may be notified by the base station to the first UE.

Alternatively, as shown in FIG. 12, a storage location of the beam information is indicated by the base station. A crossed stripe represents beam identification information, and an oblique stripe is a synchronization signal. A storage location of beam information corresponding to each of a beam 0 to a beam 3 may be indicated randomly. The base station determines the storage location and then notifies the first UE.

Specifically, the base station may notify in advance a time-frequency resource location or a data field location for storing beam information corresponding to each beam. The beam information is dynamically stored at a specific location in a beam switching process in a scanning and alignment phase and a data transmission phase, so as to facilitate receiving and demodulation by the first UE. A manner, mentioned herein, of notifying the first UE by the base station may be notifying the first UE by using a low-frequency communication channel or may be another existing manner. This is not limited in this embodiment of the present application.

The foregoing storage manner is applicable to a case in which the synchronization signal and the beam identification information are set independently, and is also applicable to a case in which the two are set together.

The receiving unit 300 is configured to receive beam quality information that is obtained by the first user equipment and the second user equipment by means of demodulation according to the beam information sent by the base station.

Optionally, the receiving unit 300 is further configured to receive beam selection information reported by the second user equipment, where the beam selection information is generated by the second user equipment according to the beam information sent by the base station and the demodulated beam quality information, and includes beam identification information of an optimal beam and beam quality information of the optimal beam, where the optimal beam is obtained after the second user equipment performs comparison according to the beam quality information.

The allocation unit 400 is configured to allocate a beam to the second user equipment according to the beam selection information, and perform data transmission with the second user equipment.

After the first UE and the base station complete data transmission, if the second UE wants to connect to a system at this time, the second UE may generate the beam selection information according to the beam information sent by the base station. The beam selection information is generated by the second user equipment according to the beam information sent by the base station and the demodulated beam quality information, and includes beam identification information of an optimal beam and beam quality information of the optimal beam, where the optimal beam is obtained after the second user equipment performs comparison according to the beam quality information.

Then, the base station allocates a beam to the second user equipment according to the beam selection information, and performs data transmission with the second user equipment.

Specific application scenarios may be divided into two types. To show a beam quality comparison process, third UE is introduced and is described with reference to FIG. 13A and FIG. 13B, and FIG. 14A and FIG. 14B.

Referring to FIG. 13A and FIG. 13B, FIG. 13A and FIG. 13B are a schematic flowchart of a first embodiment of access of a new user in a communication method according to the present application. In this embodiment, for scheduling for UE located in coverage of two beams, it is assumed that UE1 has accessed a beam 1, UE2 has accessed a beam 2 (the UE1 and the UE2 are activated users), UE3 is an inactivated user, and the UE3 is located in coverage of both the beam 1 and the beam 2. It is desired that an optimal UE3 access process is implemented without adding a beam.

As shown in FIG. 13A and FIG. 13B, the method includes the following steps.

1. A base station sends data together with beam information to the UE1 by using the beam 1.

2. The UE1 obtains, by means of demodulation by using the beam information, a corresponding beam number, that is, beam identification information, beam quality information, and the data that is sent by the base station.

3. The base station also sends the beam information to the UE3 by using the beam 1.

4. The UE3 obtains the beam identification information and the beam quality information of the beam 1 by means of demodulation by using the beam information.

5. The base station sends data together with beam information to the UE2 by using the beam 2.

6. The UE2 obtains, by means of demodulation by using the beam information, a corresponding beam number, that is, beam identification information, beam quality information, and the data that is sent by the base station.

7. The base station also sends the beam information to the UE3 by using the beam 2.

8. The UE3 obtains the beam identification information and the beam quality information of the beam 2 by means of demodulation by using the beam information.

9. The UE3 compares the two pieces of beam quality information to determine a number of a beam for access, for example, the beam 1 is selected herein for access.

10. The UE1 reports the demodulated beam number and beam quality information of an optimal beam.

11. The UE2 reports the demodulated beam number and beam quality information of an optimal beam.

12. The UE3 reports the demodulated beam number and beam quality information of an optimal beam.

13. The base station performs resource scheduling according to the information reported by the three UEs.

14. The base station completes scheduling and data transmission with the UE1.

15. The base station completes scheduling and data transmission with the UE2.

16. The base station completes scheduling and data transmission with the UE3 by using the beam 1.

Referring to FIG. 14A and FIG. 14B, FIG. 14A and FIG. 14B are a schematic flowchart of a second embodiment of access of a new user in a communication method according to the present application. In this embodiment, for scheduling for UE located in coverage of two beams, it is assumed that UE1 has accessed a beam 1, UE2 has accessed a beam 2 (the UE1 and the UE2 are activated users), UE3 is an inactivated user, and the UE3 is located in a coverage area of the beam 2 but is not located in a coverage area of the beam 1. It is desired that an optimal UE3 access process is implemented without adding a beam.

As shown in FIG. 14A and FIG. 14B, the method includes the following steps.

1. A base station sends data together with beam information to the UE1 by using the beam 1.

2. The UE1 obtains, by means of demodulation by using the beam information, a corresponding beam number, that is, beam identification information, beam quality information, and the data that is sent by the base station.

3. The base station also sends the beam information to the UE3 by using the beam 1.

4. Because the UE3 is not in the coverage area of the beam 1, the UE3 cannot obtain the beam number and the beam quality information of the beam 1 by means of demodulation by using the beam information.

5. The base station sends data together with beam information to the UE2 by using the beam 2.

6. The UE2 obtains, by means of demodulation by using the beam information, a corresponding beam number, that is, beam identification information, beam quality information, and the data that is sent by the base station.

7. The base station also sends the beam information to the UE3 by using the beam 2.

8. The UE3 obtains the beam identification information and the beam quality information of the beam 2 by means of demodulation by using the beam information.

9. The UE3 selects the beam 2 for access.

10. The UE1 reports the demodulated beam number and beam quality information of an optimal beam.

11. The UE2 reports the demodulated beam number and beam quality information of an optimal beam.

12. The UE3 reports the demodulated beam number and beam quality information of an optimal beam.

13. The base station performs resource scheduling according to the information reported by the three UEs.

14. The base station completes scheduling and data transmission with the UE1.

15. The base station completes scheduling and data transmission with the UE2.

16. The base station completes scheduling and data transmission with the UE3 by using the beam 1.

According to the manners described in FIG. 13A and FIG. 13B, and FIG. 14A and FIG. 14B, a message carrying beam information is sent, in a phase in which data is transmitted to UE1 and UE2, to UE3 that has not accessed a beam, so that quick access of an inactivated user can be implemented. Because no additional beam information needs to be sent, resource overheads are reduced and access efficiency of a new user is improved.

It should be noted that, the beam scanning unit 100, the sending unit 200, the receiving unit 300, and the allocation unit 400 may exist independently, or may be disposed in an integrated manner. In this embodiment, the beam scanning unit 100, the sending unit 200, the receiving unit 300, or the allocation unit 400 may be disposed independent of a processor of the base station in a hardware form, and may be disposed as a microprocessor; or may be built into a processor of the base station in a hardware form; or may be stored in a memory of the base station in a software form, so that the processor of the base station invokes and performs operations corresponding to the beam scanning unit 100, the sending unit 200, the receiving unit 300, and the allocation unit 400.

For example, in the second embodiment (the embodiment shown in FIG. 16) of the base station in the present application, the beam scanning unit 100 may be a processor of the base station. the sending unit 200, the receiving unit 300, and the allocation unit 400 may be built into the processor, or may be disposed independent of the processor, or may be stored in a memory in a software form, and the processor invokes and implements the functions of the units. This is not limited in this embodiment of the present application. The processor may be a central processing unit (CPU), a microprocessor, a single-chip microcomputer, or the like.

Figure 17:
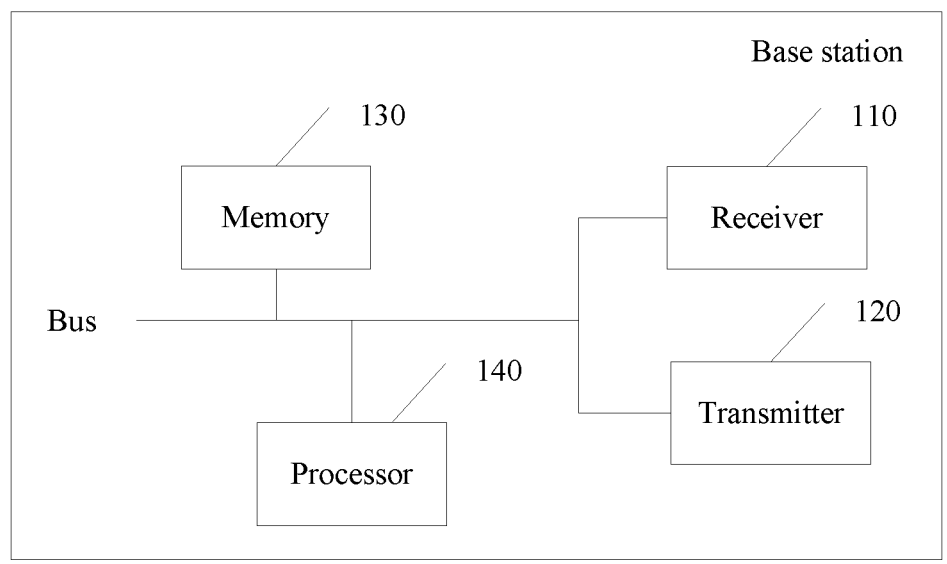
FIG. 17 is a schematic composition diagram of a third embodiment of a base station according to the present application.

Referring to FIG. 17, FIG. 17 is a schematic composition diagram of a third embodiment of a base station according to the present application. In this embodiment, the base station includes:

a receiver 110, a transmitter 120, a memory 130, and a processor 140, where the receiver 110, the transmitter 120, the memory 130, and the processor 140 are connected to a bus, the memory 130 stores a group of program code, and the processor 140 is configured to invoke the program code stored in the memory 130 to perform the following operations:

performing beam scanning and alignment together with first user equipment in a first subframe, to determine a beam that is used for sending data in the first subframe, where a quantity of beams used for sending data is greater than or equal to 1; and instructing the transmitter 120 to send, when the transmitter 120 sends data to the first user equipment, beam information of the beam used for sending data, where the beam information includes at least identification information of the beam and a synchronization signal, where the synchronization signal is used by second user equipment to synchronize with the base station; and the identification information of the beam is used by the first user equipment and the second user equipment to identify the beam sent by the base station.

Optionally, the processor 140 is further configured to:

perform beam scanning and alignment together with the first user equipment and the second user equipment in a second subframe, where a scanned beam does not include at least a beam that is scheduled for sending data in the first subframe, and the second subframe is a next subframe of the first subframe.

Optionally, the receiver 110 is configured to receive beam quality information that is obtained by the first user equipment and the second user equipment by means of demodulation according to the beam information sent by the base station, where the first user equipment is user equipment that has accessed the base station, and the second user equipment is user equipment that is to access the base station.

Optionally, the receiver 110 is configured to receive beam selection information reported by the second user equipment, where the beam selection information is generated by the second user equipment according to the beam information sent by the base station and the demodulated beam quality information, and includes beam identification information of an optimal beam and beam quality information of the optimal beam, where the optimal beam is obtained after the second user equipment performs comparison according to the beam quality information.

The processor 140 is further configured to allocate a beam to the second user equipment according to the beam selection information, and instruct the receiver 110 and the transmitter 120 to perform data transmission with the second user equipment.

Optionally, if the quantity of beams that are used for sending data in the first subframe is greater than 1, and the beam used for sending data is switched from a first beam to a second beam, when the beam information is being sent, the beam information carried in a time-frequency resource is switched to beam information of the second beam.

Optionally, the synchronization signal and the identification information in the beam information are located in different fields in a same subframe or located in a same field in a same subframe.

That is, the synchronization signal and the identification information in the beam information are set independently for the first user equipment or the second user equipment to obtain step by step; or the synchronization signal and the identification information in the beam information are set together for the first user equipment or the second user equipment to obtain simultaneously.

Optionally, the beam information is stored in a preset fixed resource block; or the processor 140 is further configured to indicate a storage location of the beam information.

That the beam information is stored in a preset fixed resource block includes:

in a multicarrier system, preset contiguous or non-contiguous frequency resources are selected to store the beam information; or in a single carrier system, the beam information is stored in different time segments; or the beam information is stored in a data field.

An embodiment of the present application further provides a computer storage medium, and the computer storage medium stores a program. When the program runs, some or all of the steps recorded in either of the first or the second embodiment of the communication method in the present application are included.

Figure 18:
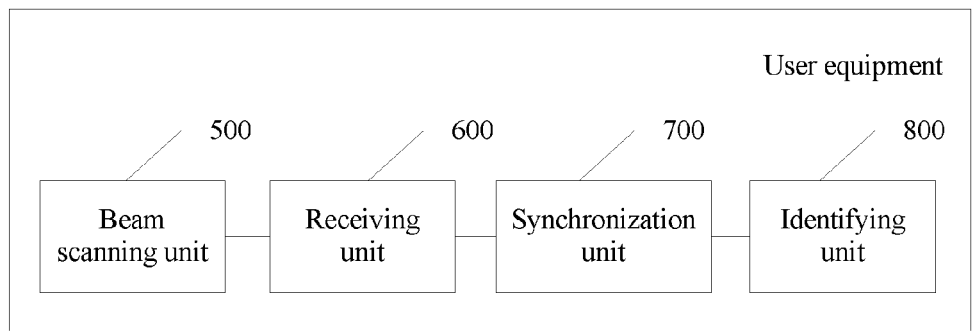
FIG. 18 is a schematic composition diagram of a first embodiment of user equipment according to the present application.

Referring to FIG. 18, FIG. 18 is a schematic composition diagram of a first embodiment of user equipment according to the present application. In this embodiment, the user equipment includes:

a beam scanning unit 500, configured to: when a base station performs beam scanning and alignment together with the user equipment in a first subframe, determine a beam that is used for sending data in the first subframe, where a quantity of beams used for sending data is greater than or equal to 1;

a receiving unit 600, configured to: when the base station sends data to the user equipment, receive beam information sent by the base station when the base station sends the data by using the beam, where the beam information includes at least identification information of the beam and a synchronization signal;

a synchronization unit 700, configured to synchronize with the base station according to the synchronization signal; and an identifying unit 800, configured to identify, according to the identification information of the beam, the beam sent by the base station.

Optionally, the synchronization signal and the identification information in the beam information are located in different fields in a same subframe or located in a same field in a same subframe.

That is, the synchronization signal and the identification information in the beam information are set independently for the processor to obtain step by step; or the synchronization signal and the identification information in the beam information are set together for the processor to obtain simultaneously.

It should be noted that, the user equipment in this embodiment of the present application may be user equipment that has accessed the base station or user equipment that has not accessed the base station. When the user equipment has accessed the base station, the user equipment may perform data transmission with the base station according to a currently allocated beam, and reduce, during beam scanning and alignment, a quantity of beams that are scanned each time to reduce a time for beam scanning and alignment, and may further report beam quality information, so that the base station performs more optimized beam scheduling. When the user equipment has not accessed the base station, the user equipment may receive, when the base station sends data to other user equipment that has accessed the base station, beam information sent by the base station, and obtain beam quality information by means of demodulation. After comparison, the user equipment reports beam identification information (such as a beam number) of a beam having best quality for the user equipment, and beam quality information of the beam. Therefore, the base station can reduce a time for performing beam scanning and alignment together with the user equipment, and directly allocate a beam with relatively good quality to the user equipment, so as to implement quick access of the user equipment that has not accessed the base station.

Figure 19:
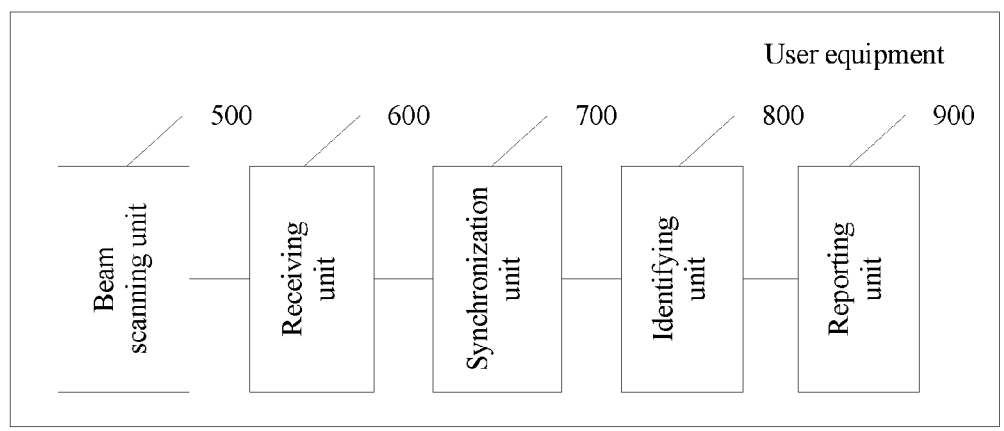
FIG. 19 is a schematic composition diagram of a second embodiment of user equipment according to the present application.

Referring to FIG. 19, FIG. 19 is a schematic composition diagram of a second embodiment of user equipment according to the present application. In this embodiment, the user equipment includes:

a beam scanning unit 500, configured to: when a base station performs beam scanning and alignment together with the user equipment in a first subframe, determine a beam that is used for sending data in the first subframe, where a quantity of beams used for sending data is greater than or equal to 1;

a receiving unit 600, configured to: when the base station sends data to the user equipment, receive beam information sent by the base station when the base station sends the data by using the beam, where the beam information includes at least identification information of the beam and a synchronization signal;

a synchronization unit 700, configured to synchronize with the base station according to the synchronization signal; and an identifying unit 800, configured to identify, according to the identification information of the beam, the beam sent by the base station.

Optionally, the synchronization signal and the identification information in the beam information are located in different fields in a same subframe or located in a same field in a same subframe.

That is, the synchronization signal and the identification information in the beam information are set independently for the processor to obtain step by step; or the synchronization signal and the identification information in the beam information are set together for the processor to obtain simultaneously.

Optionally, the user equipment further includes a reporting unit 900.

The beam scanning unit 500 is further configured to:

perform beam scanning and alignment together with the base station in a second subframe, where a scanned beam does not include at least a beam that is scheduled for sending data in the first subframe, and the second subframe is a next subframe of the first subframe.

The reporting unit 900 is configured to report beam selection information to the base station, where the beam selection information is generated by the user equipment according to the beam information sent by the base station and demodulated beam quality information, and includes beam identification information of an optimal beam and beam quality information of the optimal beam, where the optimal beam is obtained after the user equipment performs comparison according to the beam quality information.

The receiving unit 600 is further configured to perform data transmission with the base station by using a beam allocated by the base station to the user equipment according to the beam selection information.

It should be noted that, the beam scanning unit 500, the receiving unit 600, the synchronization unit 700, the identifying unit 800, and the reporting unit 900 may exist independently, or may be disposed in an integrated manner. In this embodiment, the beam scanning unit 500, the receiving unit 600, the synchronization unit 700, the identifying unit 800, or the reporting unit 900 may be disposed independent of a processor of the user equipment in a hardware form, and may be disposed as a microprocessor; or may be built into a processor of the user equipment in a hardware form; or may be stored in a memory of the user equipment in a software form, so that the processor of the user equipment invokes and performs operations corresponding to the beam scanning unit 500, the receiving unit 600, the synchronization unit 700, the identifying unit 800, and the reporting unit 900.

For example, in the second embodiment (the embodiment shown in FIG. 19) of the user equipment in the present application, the beam scanning unit 500 may be a processor of the user equipment. Functions of the receiving unit 600, the synchronization unit 700, the identifying unit 800, and the reporting unit 900 may be built into the processor, or may be set independent of the processor, or may be stored in a memory in a software form, and the processor invokes and implements the functions of the units. This is not limited in this embodiment of the present application. The processor may be a central processing unit (CPU), a microprocessor, a single-chip microcomputer, or the like.

Figure 20:
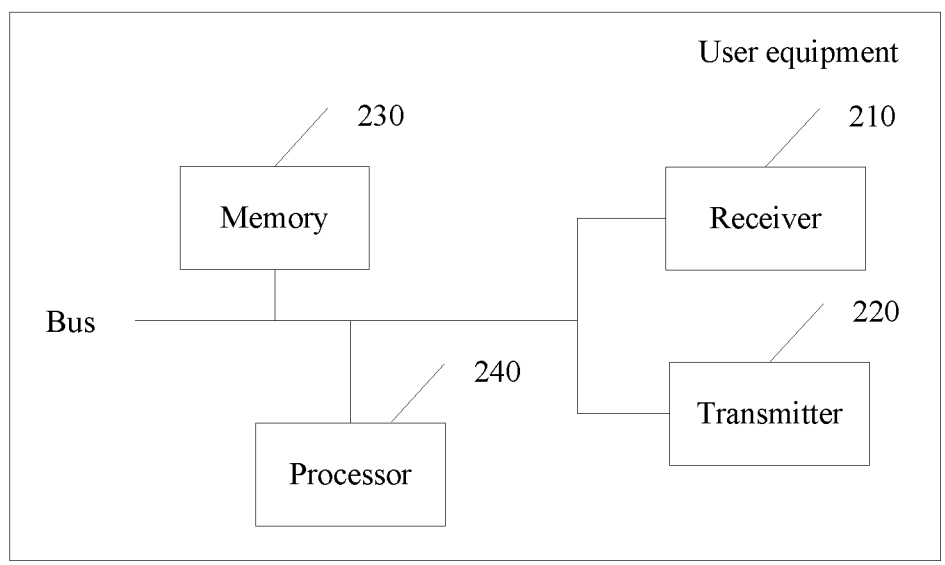
FIG. 20 is a schematic composition diagram of a third embodiment of user equipment according to the present application.

Referring to FIG. 20, FIG. 20 is a schematic composition diagram of a third embodiment of user equipment according to the present application. In this embodiment, the user equipment includes:

a receiver 210, a transmitter 220, a memory 230, and a processor 240, where the receiver 210, the transmitter 220, the memory 230, and the processor 240 are connected to a bus, the memory 230 stores a group of program code, and the processor 240 is configured to invoke the program code stored in the memory 230 to perform the following operations:

when a base station performs beam scanning and alignment together with the user equipment in a first subframe, determining a beam that is used for sending data in the first subframe;

when the base station sends data to the user equipment, receiving beam information sent by the base station when the base station sends the data by using the beam, where the beam information includes at least identification information of the beam and a synchronization signal;

synchronizing with the base station according to the synchronization signal; and identifying, according to the identification information of the beam, the beam sent by the base station.

Optionally, the processor 240 is further configured to:

perform beam scanning and alignment together with the base station in a second subframe, where a scanned beam does not include at least a beam that is scheduled for sending data in the first subframe, and the second subframe is a next subframe of the first subframe.

Optionally, the transmitter 220 is configured to report beam selection information to the base station, where the beam selection information is generated by the processor according to the beam information sent by the base station and demodulated beam quality information, and includes beam identification information of an optimal beam and beam quality information of the optimal beam, where the optimal beam is obtained after the processor performs comparison according to the beam quality information.

The receiver 210 and the transmitter 220 are further configured to perform data transmission with the base station by using a beam allocated by the base station to the user equipment according to the beam selection information.

An embodiment of the present application further provides a computer storage medium, and the computer storage medium stores a program. When the program runs, some or all of the steps recorded in either of the third or the fourth embodiment of the communication method in the present application are included.

It should be noted that the embodiments in this specification are all described in a progressive manner, each embodiment focuses on a difference from other embodiments, and for same or similar parts in the embodiments, reference may be made to these embodiments. An apparatus embodiment is basically similar to a method embodiment, and therefore is described briefly; for related parts, reference may be made to related descriptions in the method embodiment.

According to the description of the foregoing embodiments, the present application has the following advantages:

When each beam is being sent, beam information of the beam is inserted into a time-frequency resource block, so that there is no need to traverse all beams in each subframe period. This reduces a time spent on scanning and alignment, and decreases a quantity of beam switching times. A scanning period is dynamically adjusted with reference to a historical beam sending status, and there is no need to configure a fixed scanning period. This can greatly reduce a timeslot length occupied by a scanning period in an entire frame structure, reduce resource overheads, and ensure that all beams can be transmitted periodically. User equipment that has not accessed the base station can obtain the beam information when user equipment that has accessed the base station performs data transmission with the base station. This facilitates subsequent quick access of a new user.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The communication method, the base station, and the user equipment provided in the embodiments of the present application are described in detail above. Principles and implementation manners of the present application are described in this specification by using specific examples. The descriptions about the embodiments are merely provided to help understand the method and core ideas of the present application. In addition, a person of ordinary skill in the art can make modifications to a specific implementation manner and an application scope according to the ideas of the present application. In conclusion, the content of this specification shall not be construed as a limitation on the present application.

What is claimed is:

1. A communication method, comprising:
  performing, by a base station, beam scanning and alignment together with a first terminal in a first subframe, to determine a beam that is used for sending data in the first subframe, wherein a quantity of beams used for sending data is greater than or equal to 1;
  when sending data to the first terminal by using the beam, sending, by the base station, beam information of the beam to a second terminal, wherein the first terminal is a terminal that already has an access to the base station, and the second terminal is a terminal that is yet to access the base station, the beam information comprising at least identification information of the beam and a synchronization signal; and
  wherein the synchronization signal is used by a second terminal to synchronize with the base station and the identification information of the beam is used by the first terminal and the second terminal to identify the beam sent by the base station.

2. The method according to claim 1, wherein
  the base station performs beam scanning and alignment together with the first terminal and the second terminal in a second subframe, wherein a scanned beam does not comprise at least a beam that is scheduled for sending data in the first subframe, and the second subframe is a next subframe to the first subframe.

3. The method according to claim 1, wherein the method further comprises: receiving beam quality information that is obtained by the first terminal and the second terminal by means of demodulation according to the beam information sent by the base station.

4. The method according to claim 3, further comprising:
  receiving, by the base station, beam selection information reported by the second terminal, wherein the beam selection information is generated by the second terminal according to the beam information sent by the base station and the demodulated beam quality information, and comprises beam identification information of an optimal beam and beam quality information of the optimal beam, wherein the optimal beam is obtained after the second terminal performs comparison according to the demodulated beam quality information; and
  allocating a beam to the second terminal according to the beam selection information, and performing data transmission with the second terminal.

5. The method according to claim 2, wherein if the quantity of beams that are used for sending data in the first subframe is greater than 1, and the beam used for sending data is switched from a first beam to a second beam, when the beam information is being sent, the beam information carried in a time-frequency resource is switched to beam information of the second beam.

6. The method according to claim 1, wherein the synchronization signal and the identification information in the beam information are located in different fields in a same subframe or located in a same field in a same subframe.

7. The method according to claim 1, wherein
  the beam information is stored in a preset fixed resource block; or
  a storage location of the beam information is indicated by the base station.

8. A communication method, comprising:
  when a base station performs beam scanning and alignment together with a first terminal in a first subframe, determining, by the base station, a beam that is used for sending data in the first subframe;
  when sending data to the first terminal by using the beam, sending, by the base station, beam information of the beam to the first terminal and a second terminal, wherein the first terminal is a terminal that already has an access to the base station, and the second terminal is a terminal that is yet to access the base station, wherein the beam information comprises at least identification information of the beam and a synchronization signal;

receiving, by the second terminal, the beam information sent by the base station;

synchronizing, by the second terminal, with the base station according to the synchronization signal; and identifying, by the second terminal, according to the identification information of the beam, the beam sent by the base station.

9. The method according to claim 8, further comprising:
performing, by the first terminal, beam scanning and alignment together with the base station in a second subframe, wherein a scanned beam does not comprise at least a beam that is scheduled for sending data in the first subframe, and the second subframe is a next subframe to the first subframe.

10. The method according to claim 8, further comprising:
reporting, by the second terminal, beam selection information to the base station, wherein the beam selection information is generated by the second terminal according to the beam information sent by the base station and demodulated beam quality information, and comprises beam identification information of an optimal beam and beam quality information of the optimal beam, wherein the optimal beam is obtained after the first terminal performs comparison according to the beam quality information; and performing data transmission with the base station by using a beam allocated by the base station to the second terminal according to the beam selection information.

11. The method according to claim 8, wherein the synchronization signal and the identification information in the beam information are located in different fields in a same subframe or located in a same field in a same subframe.

12. A base station, comprising:
a receiver, a transmitter, a memory, and a processor, wherein the memory stores a group of program code, and the processor is configured to invoke the program code stored in the memory to perform the following operations:

performing beam scanning and alignment together with a first terminal in a first subframe, to determine a beam that is used for sending data in the first subframe, wherein a quantity of beams used for sending data is greater than or equal to 1; and instructing the transmitter to send, when the transmitter sends data to the first terminal, beam information of the beam to a second terminal, wherein the first terminal is a terminal that already has an access to the base station, and the second terminal is a terminal that is yet to access the base station, the beam information comprising at least identification information of the beam and a synchronization signal, wherein the synchronization signal is used by a second terminal to synchronize with the base station; and the identification information of the beam is used by the first terminal and the second terminal to identify the beam sent by the base station.

13. The base station according to claim 12, wherein the processor is further configured to:
perform beam scanning and alignment together with the first terminal and the second terminal in a second subframe, wherein a scanned beam does not comprise at least a beam that is scheduled for sending data in the first subframe, and the second subframe is a next subframe to the first subframe.

14. The base station according to claim 12, wherein the receiver is configured to receive beam quality information that is obtained by the first terminal and the second terminal by means of demodulation according to the beam information sent by the base station.

15. The base station according to claim 12, wherein the receiver is configured to receive beam selection information reported by the second terminal, wherein the beam selection information is generated by the second terminal according to the beam information sent by the base station and the demodulated beam quality information, and comprises beam identification information of an optimal beam and beam quality information of the optimal beam, wherein the optimal beam is obtained after the second terminal performs comparison according to the beam quality information; and the processor is further configured to allocate a beam to the second terminal according to the beam selection information, and instruct the receiver and the transmitter to perform data transmission with the second terminal.

16. The base station according to claim 12, wherein
if the quantity of beams that are used for sending data in the first subframe is greater than 1, and the beam used for sending data is switched from a first beam to a second beam, when the beam information is being sent, the beam information carried in a time-frequency resource is switched to beam information of the second beam.

17. A terminal, comprising:
a receiver, a transmitter, a memory, and a processor, wherein the memory stores machine-readable instructions, and the processor is configured to invoke the machine-readable instructions stored in the memory to perform the following operations:

performing beam scanning and alignment together with a base station in a first subframe, to determine a beam that is used for sending data in the first subframe;

when the base station sends data to the terminal, receiving beam information sent by the base station when the base station sends the data by using the beam, wherein the beam information comprises at least identification information of the beam and a synchronization signal, and the beam information is also sent by the base station to a second terminal, wherein the terminal is a first terminal that already has an access to the base station, and the second terminal is a terminal that is yet to access the base station;

synchronizing with the base station according to the synchronization signal; and identifying, according to the identification information of the beam, the beam sent by the base station.

18. The terminal according to claim 17, wherein the processor is further configured to:
perform beam scanning and alignment together with the base station in a second subframe, wherein a scanned beam does not comprise at least a beam that is scheduled for sending data in the first subframe, and the second subframe is a next subframe to the first subframe.

19. The terminal according to claim 17, wherein the transmitter is configured to report beam selection information to the base station, wherein the beam selection information is generated by the processor according to the beam information sent by the base station and demodulated beam quality information, and comprises beam identification information of an optimal beam and beam quality information of the optimal beam, wherein the optimal beam is obtained after the processor performs comparison according to the beam quality information; and the receiver and the transmitter are further configured to perform data transmission with the base station by using a beam allocated by the base station to the terminal according to the beam selection information.

20. The terminal according to terminal claim 17, wherein the synchronization signal and the identification information in the beam information are located in different fields in a same subframe or located in a same field in a same subframe.

* * * * *